United States Patent
Legendre et al.

(10) Patent No.: US 8,754,650 B2
(45) Date of Patent: Jun. 17, 2014

(54) DETECTION OF 3D FORMATION STRUCTURES BASED ON ELECTRO-MAGNETIC COUPLING MEASUREMENTS

(75) Inventors: Emmanuel Legendre, Chatou (FR); Fabienne Legendre, Chatou (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 783 days.

(21) Appl. No.: 12/718,704

(22) Filed: Mar. 5, 2010

(65) Prior Publication Data

US 2011/0215809 A1   Sep. 8, 2011

(51) Int. Cl.
*G01V 3/10* (2006.01)

(52) U.S. Cl.
USPC ........... 324/339; 324/323; 324/324; 324/325; 324/337; 324/338

(58) Field of Classification Search
USPC ........................ 324/339, 338, 351, 323–337
See application file for complete search history.

(56) References Cited

U.S. PATENT DOCUMENTS

| | | | | |
|---|---|---|---|---|
| 2,754,475 A | * | 7/1956 | Norelius | 324/366 |
| 4,899,112 A | | 2/1990 | Clark et al. | |
| 5,367,262 A | * | 11/1994 | Manning | 324/341 |
| 6,128,577 A | * | 10/2000 | Assa et al. | 702/2 |
| 6,167,348 A | * | 12/2000 | Cannon | 702/13 |
| 6,670,813 B2 | * | 12/2003 | Strack | 324/323 |
| 7,299,131 B2 | * | 11/2007 | Tabarovsky et al. | 702/7 |
| 2002/0173914 A1 | * | 11/2002 | Zhang et al. | 702/7 |
| 2004/0196047 A1 | * | 10/2004 | Fanini et al. | 324/339 |
| 2006/0125479 A1 | * | 6/2006 | Chemali et al. | 324/339 |
| 2007/0208546 A1 | * | 9/2007 | Fang et al. | 702/191 |
| 2007/0236221 A1 | * | 10/2007 | Merchant et al. | 324/339 |
| 2008/0143336 A1 | * | 6/2008 | Legendre et al. | 324/339 |
| 2008/0284440 A1 | * | 11/2008 | Moore | 324/333 |

* cited by examiner

*Primary Examiner* — Huy Q Phan
*Assistant Examiner* — Temilade S Rhodes-Vivour
(74) *Attorney, Agent, or Firm* — Kenneth Liu; Jeremy Berman

(57) ABSTRACT

The present disclosure relates to a method to determine a characteristic of a subsurface formation using electromagnetic coupling components. A downhole logging tool having one or more transmitters and one or more receivers, and being capable of measuring the electromagnetic coupling components is provided. The electromagnetic coupling components are measured using the downhole logging tool and used to form a 3-D Lateral Indicator and/or a 3-D Longitudinal Indicator. The 3-D Lateral Indicator and/or the 3-D Longitudinal Indicator are used to determine the characteristic of the subsurface formation.

19 Claims, 28 Drawing Sheets

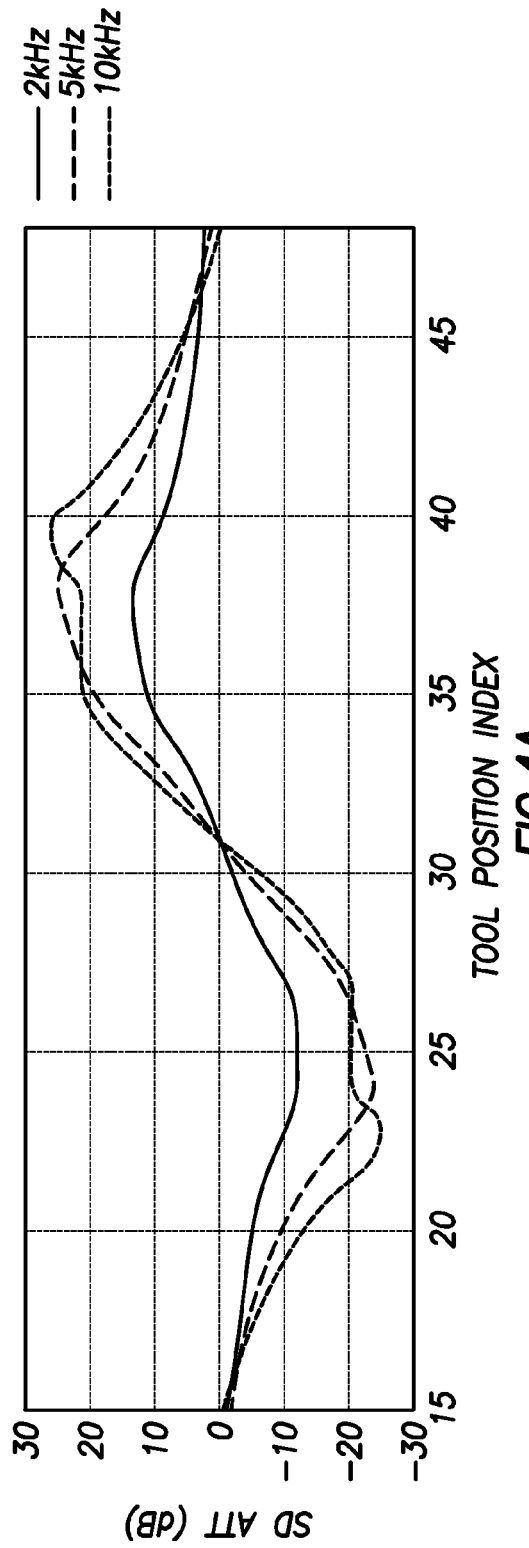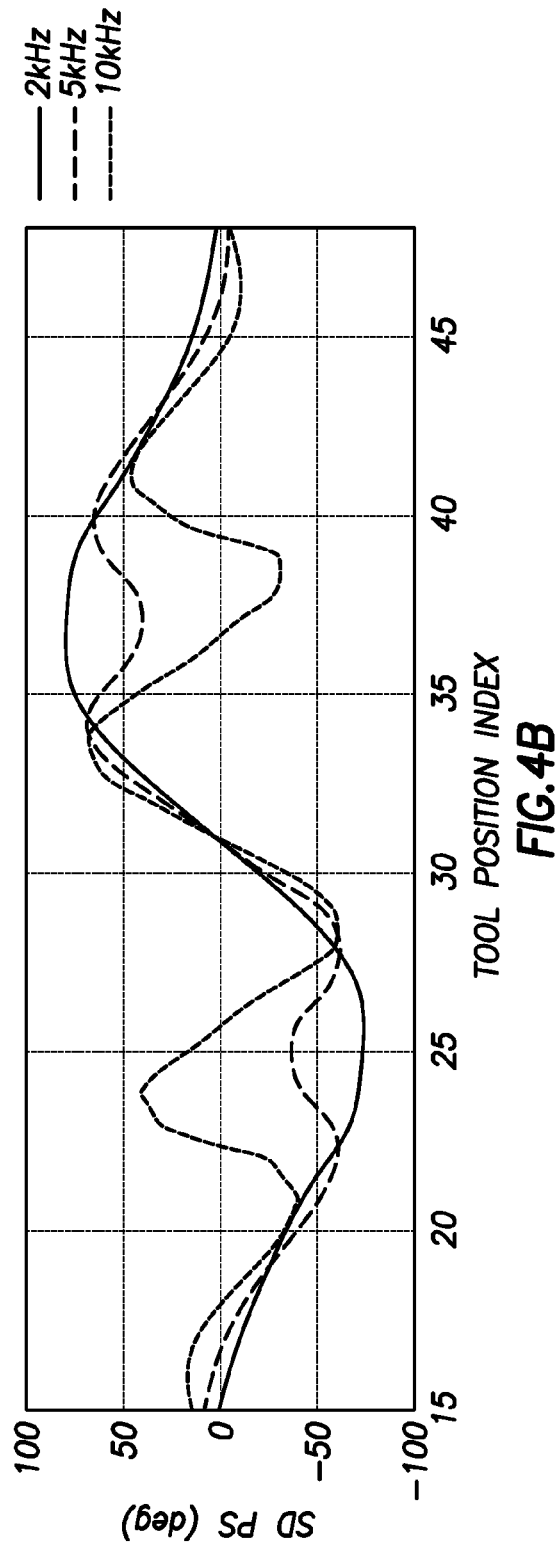

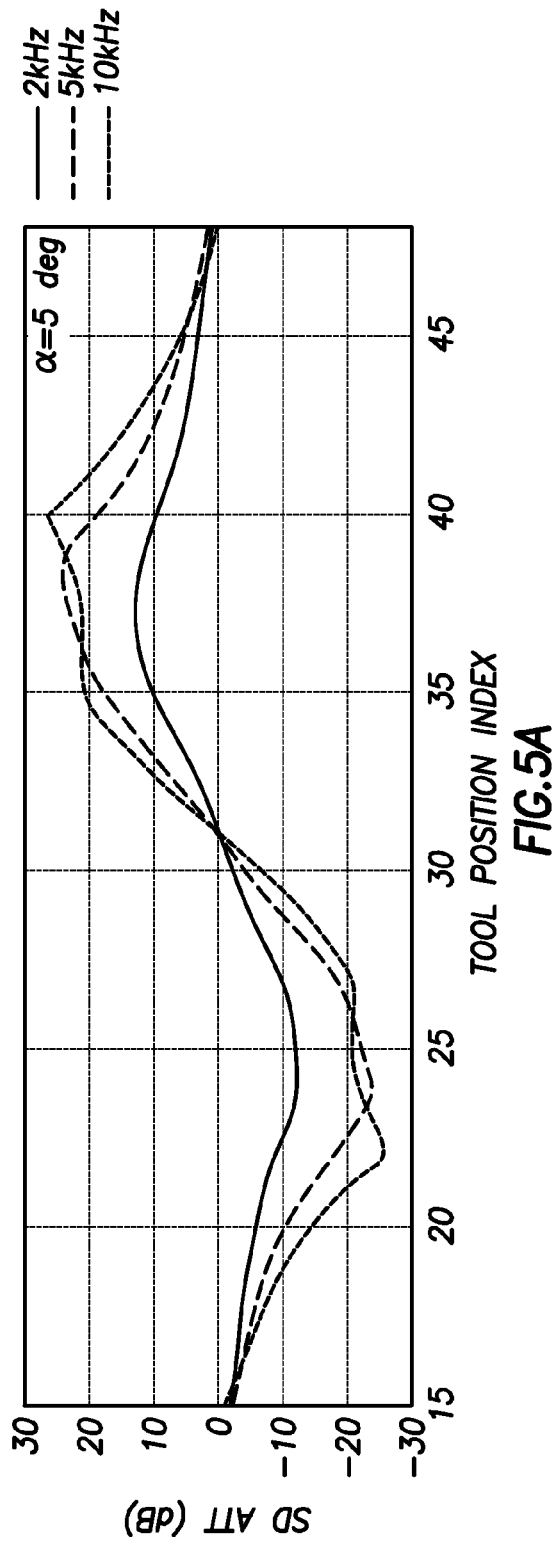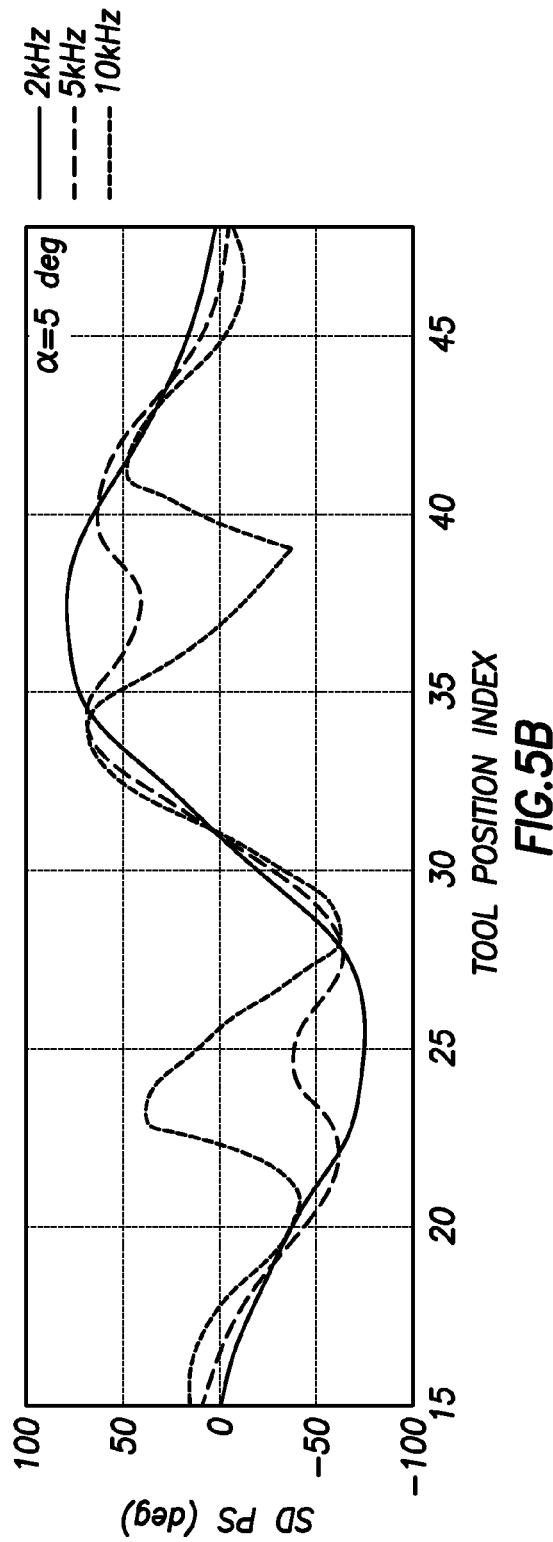
FIG.5A
FIG.5B

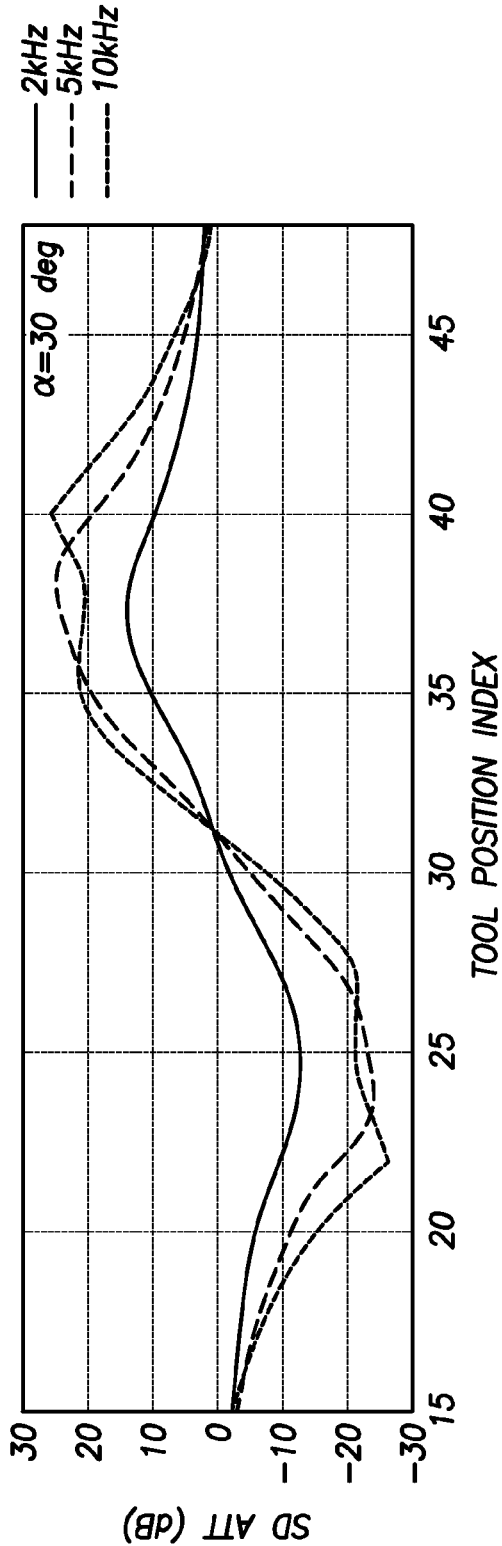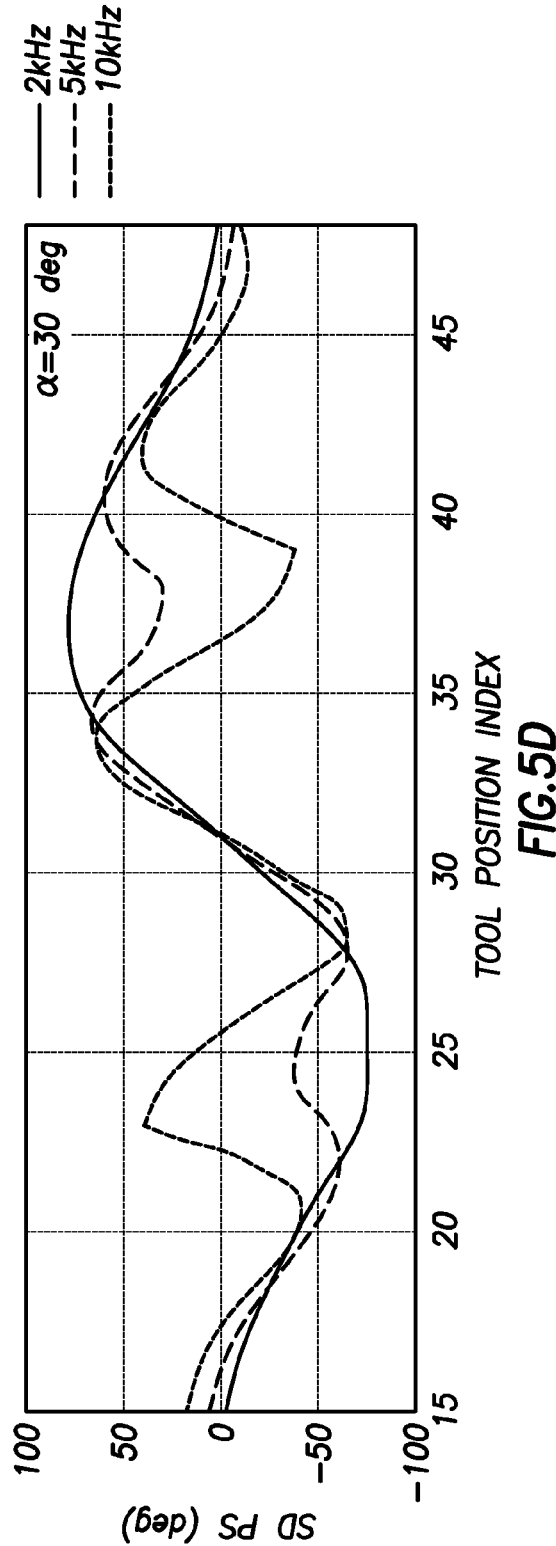
FIG.5C
FIG.5D

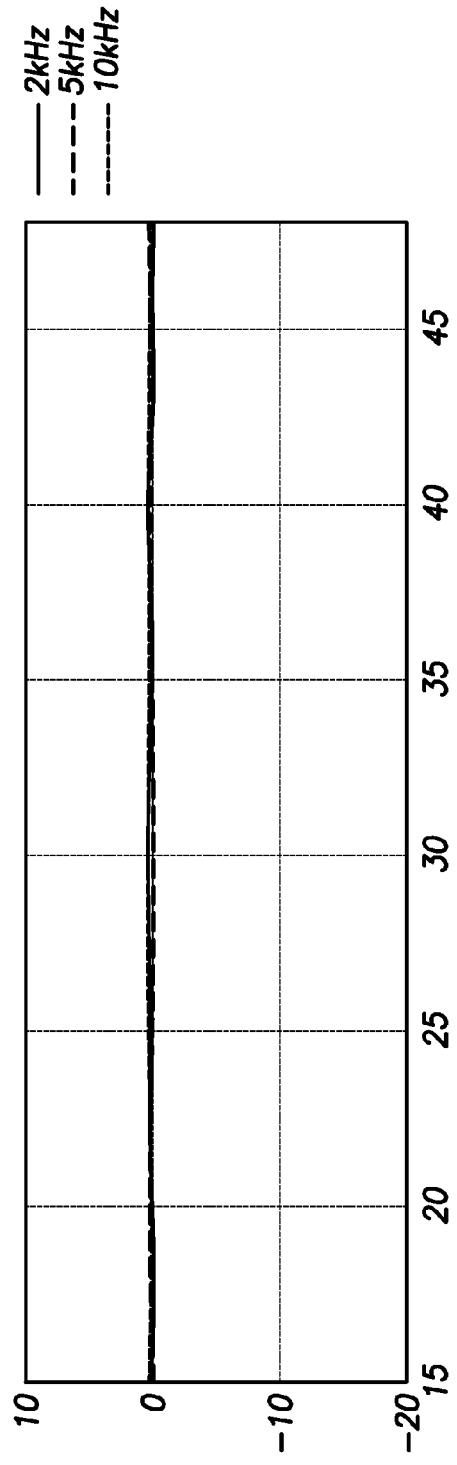
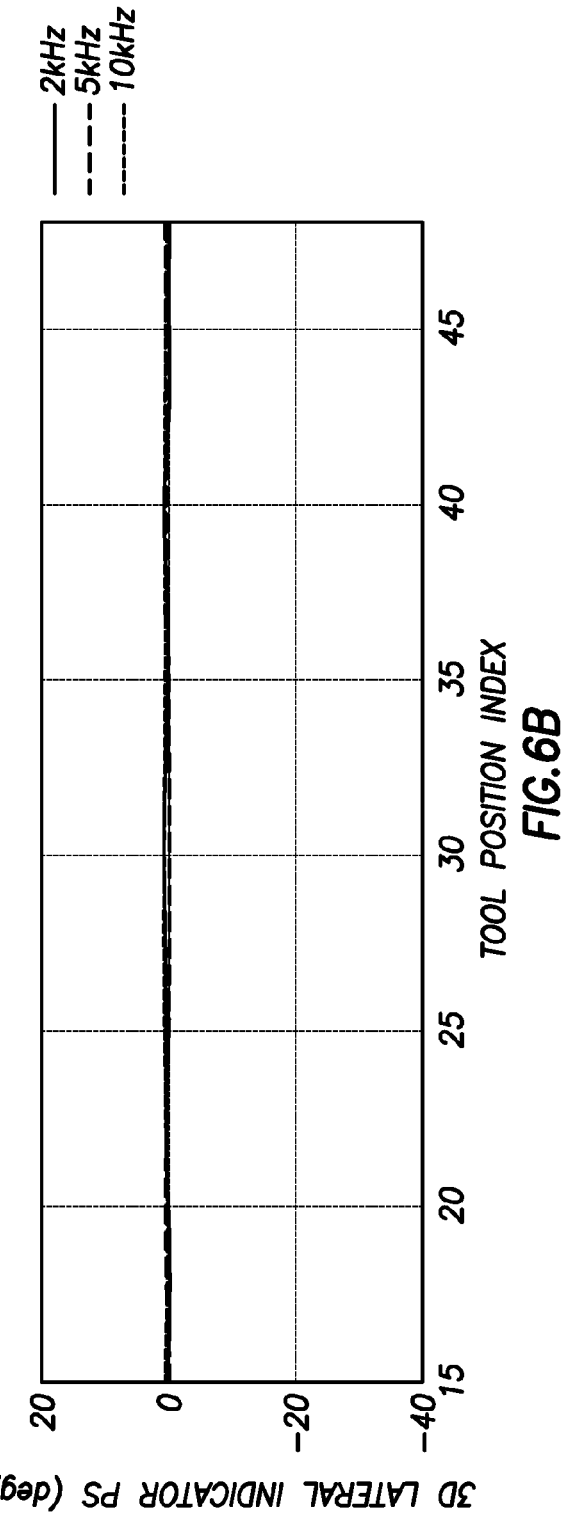
FIG.6A
FIG.6B

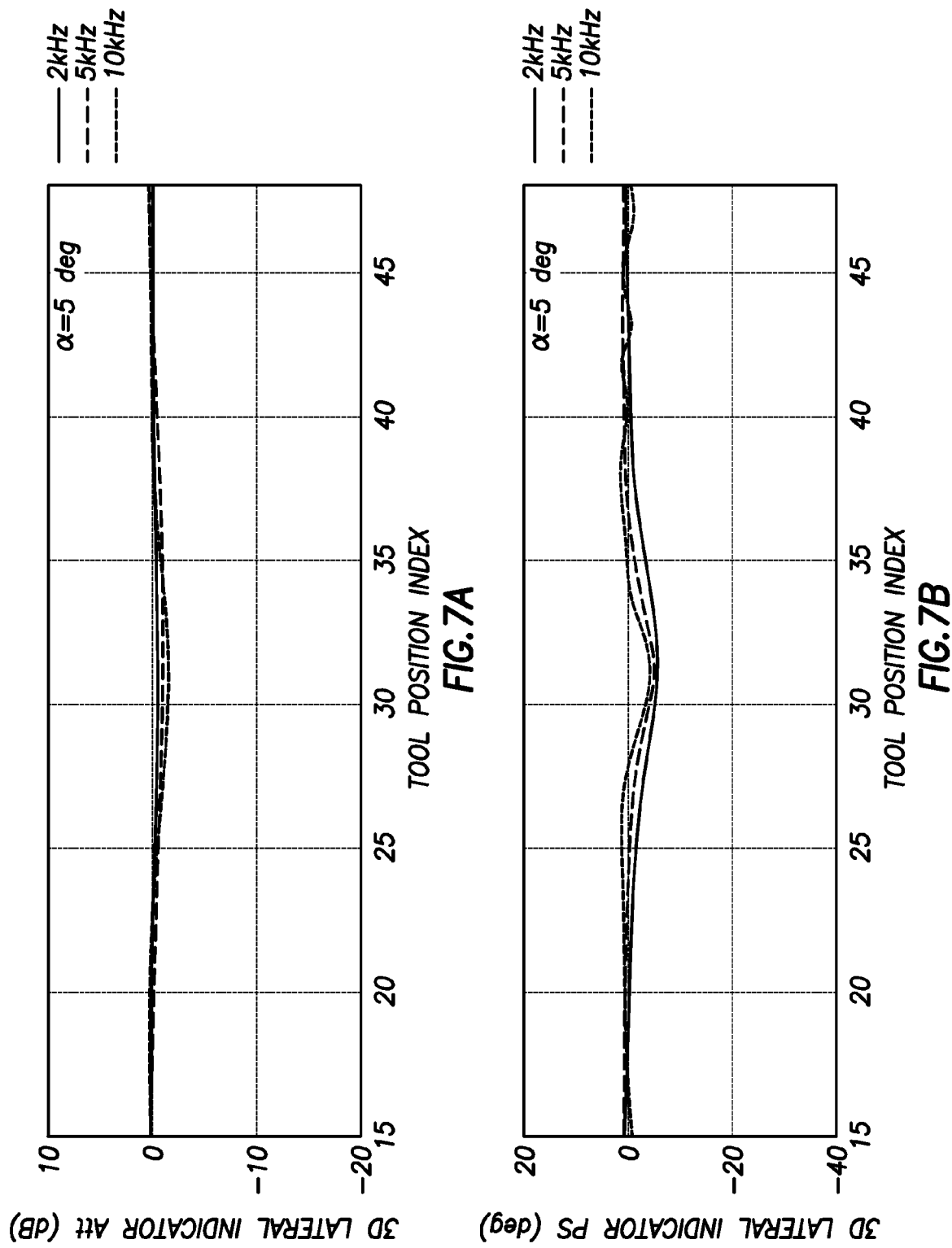

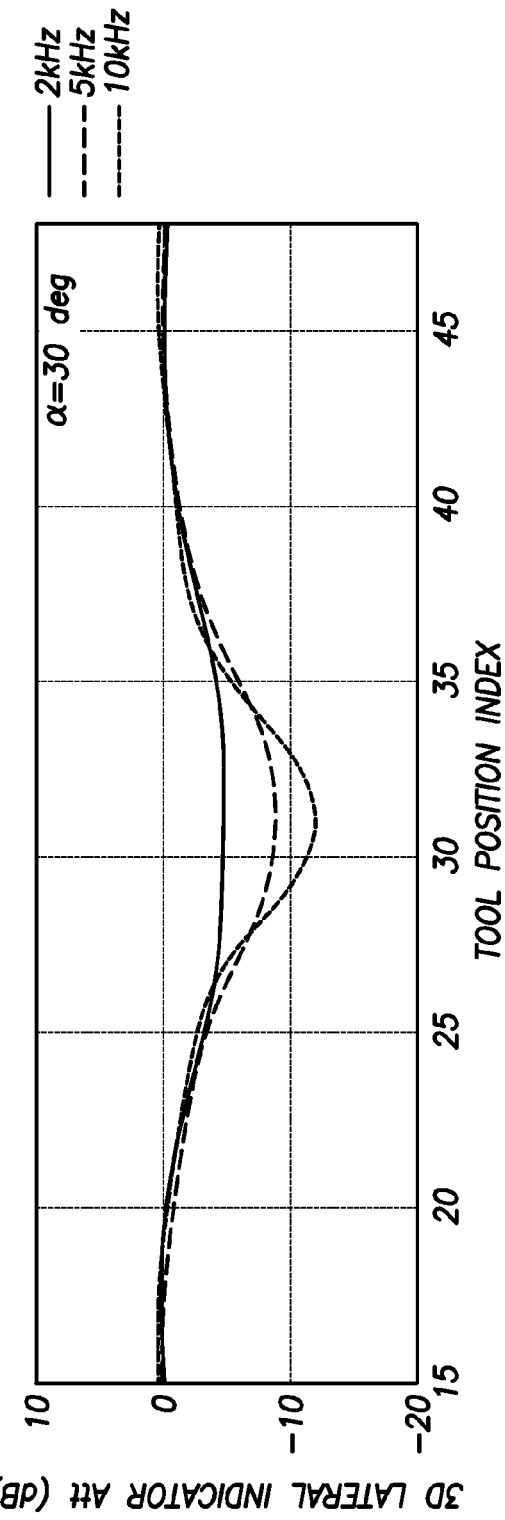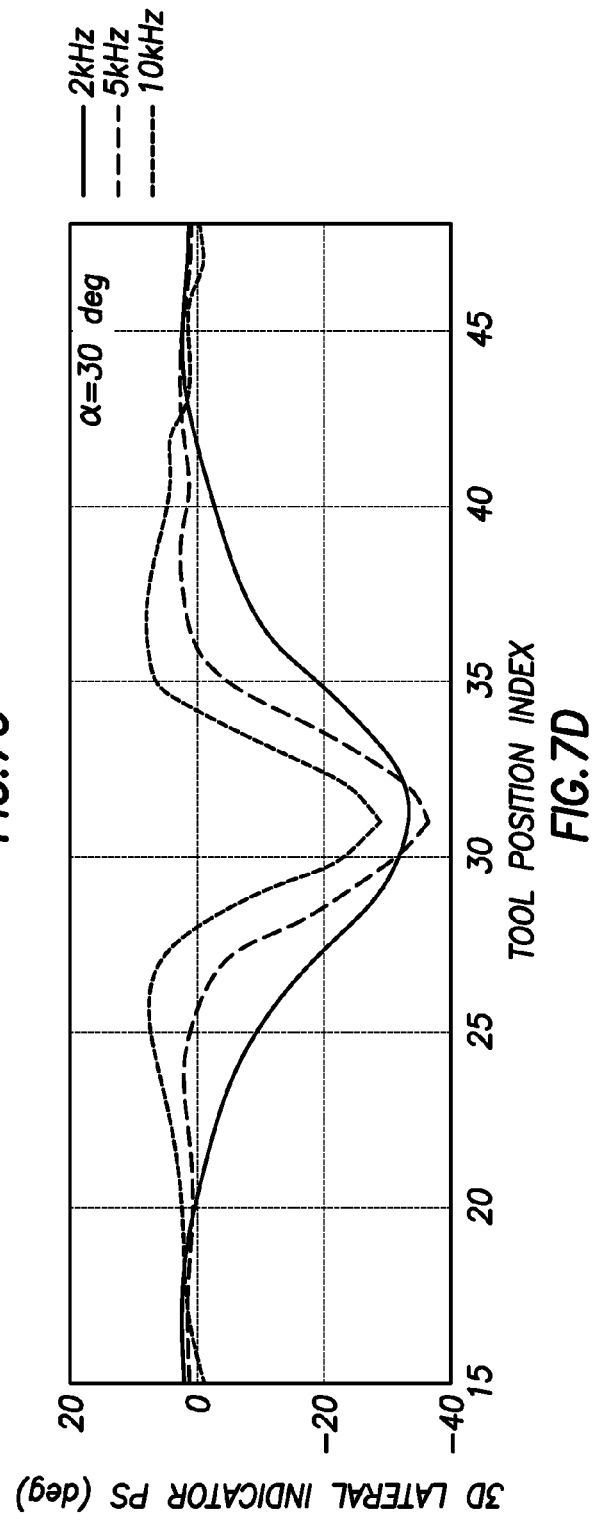
FIG.7C
FIG.7D

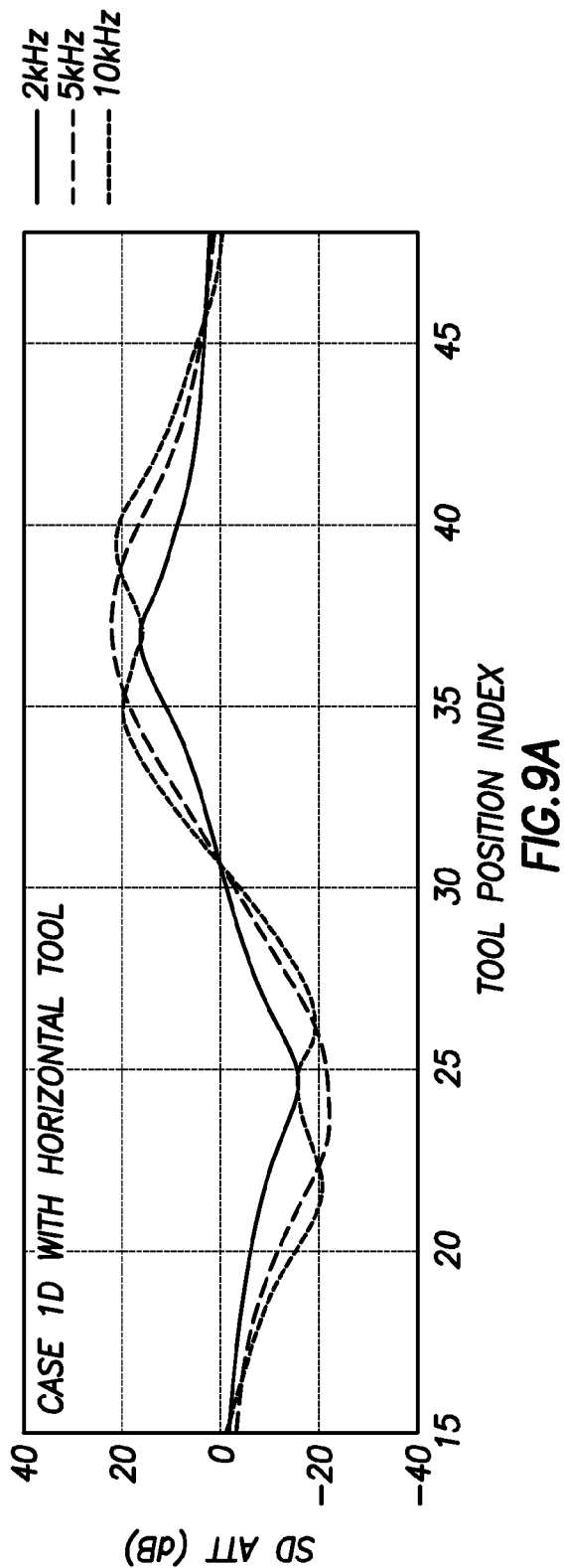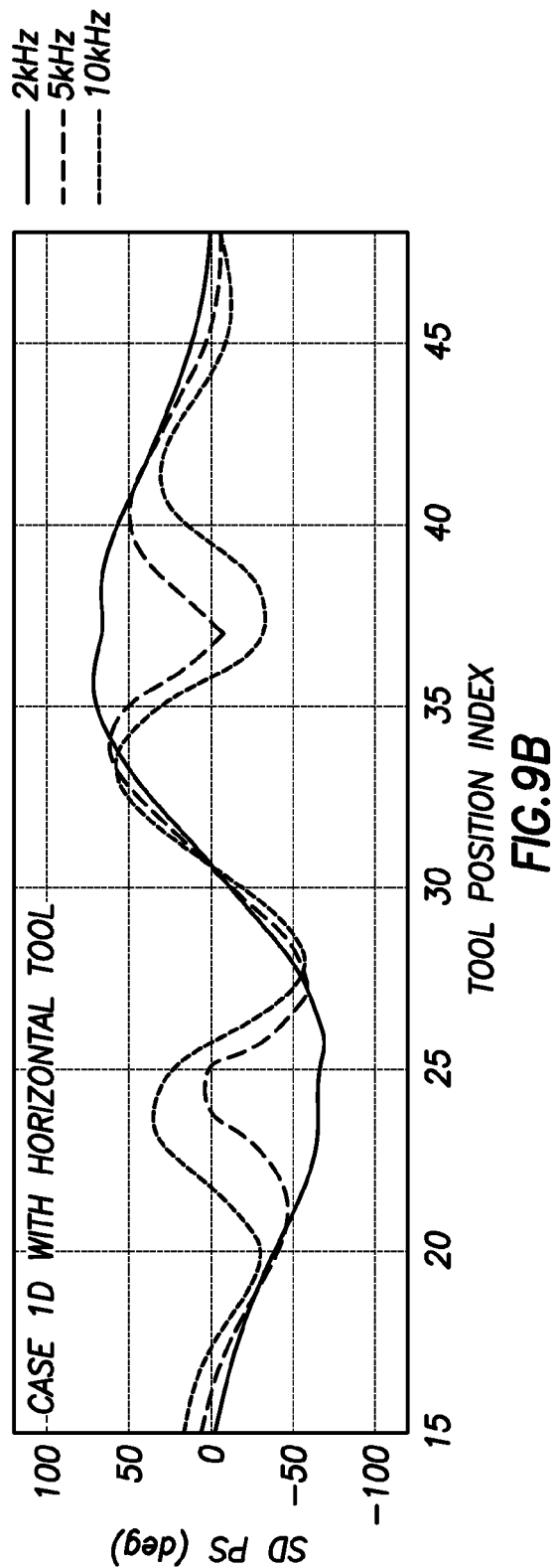

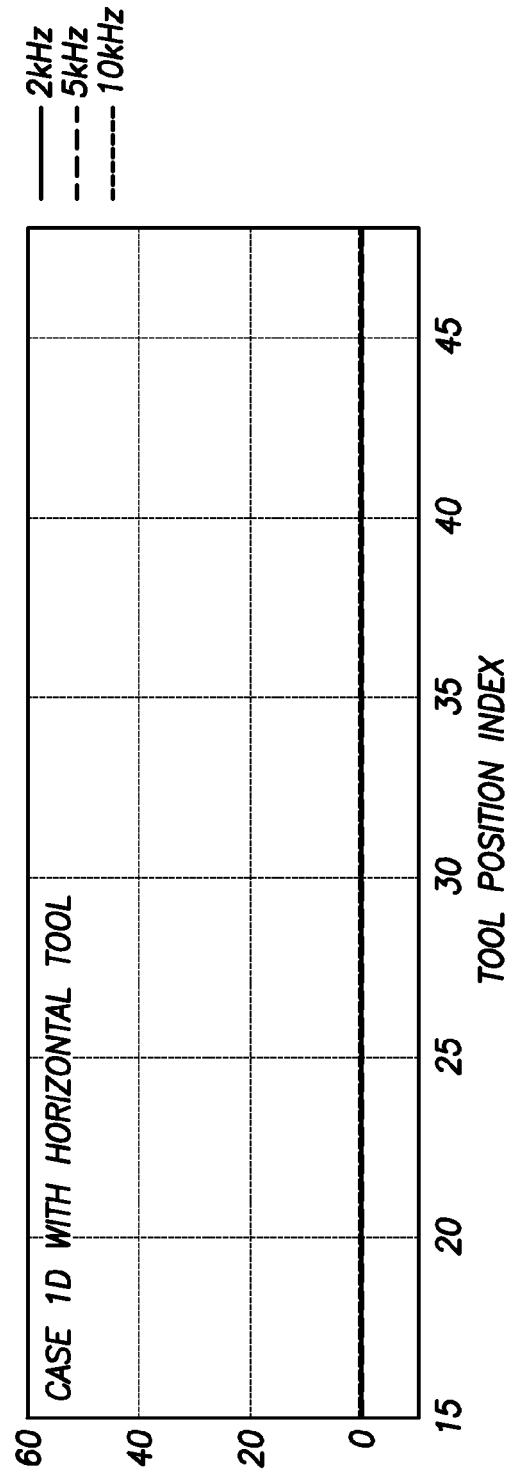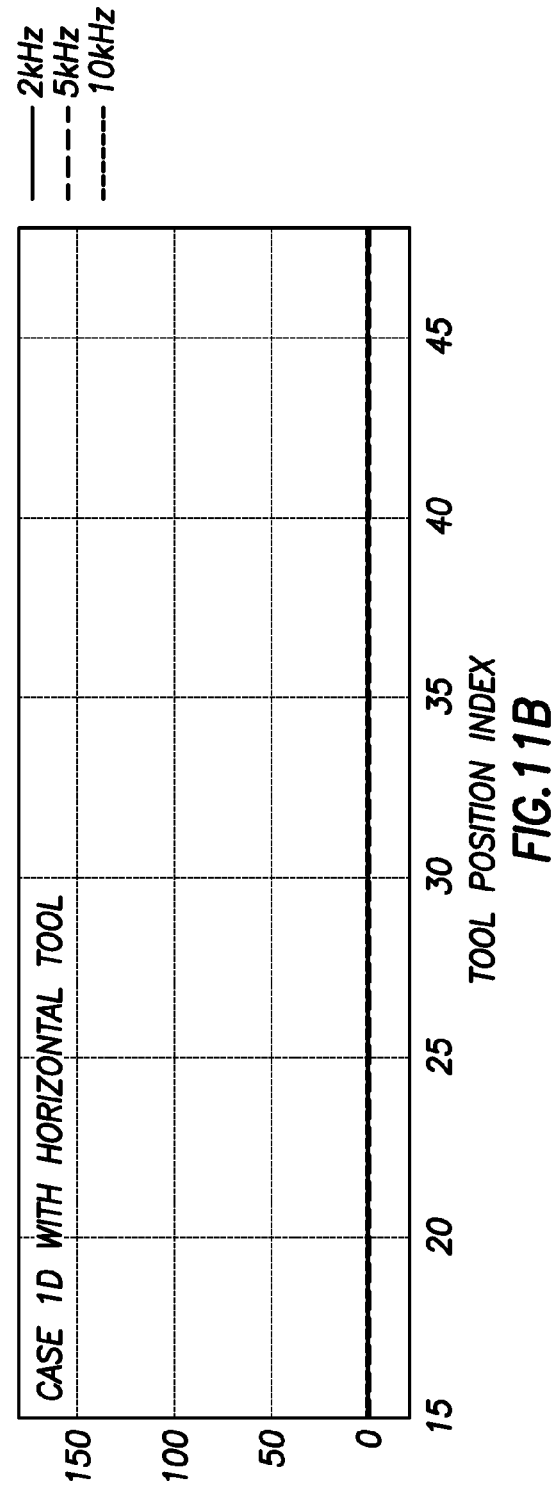

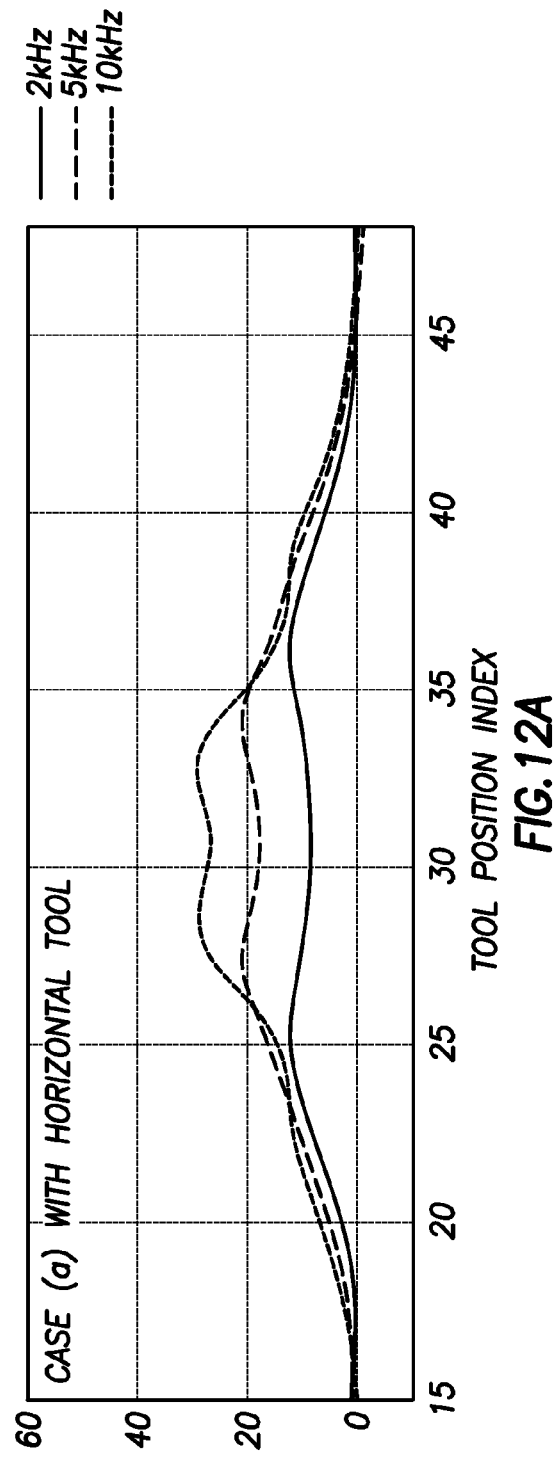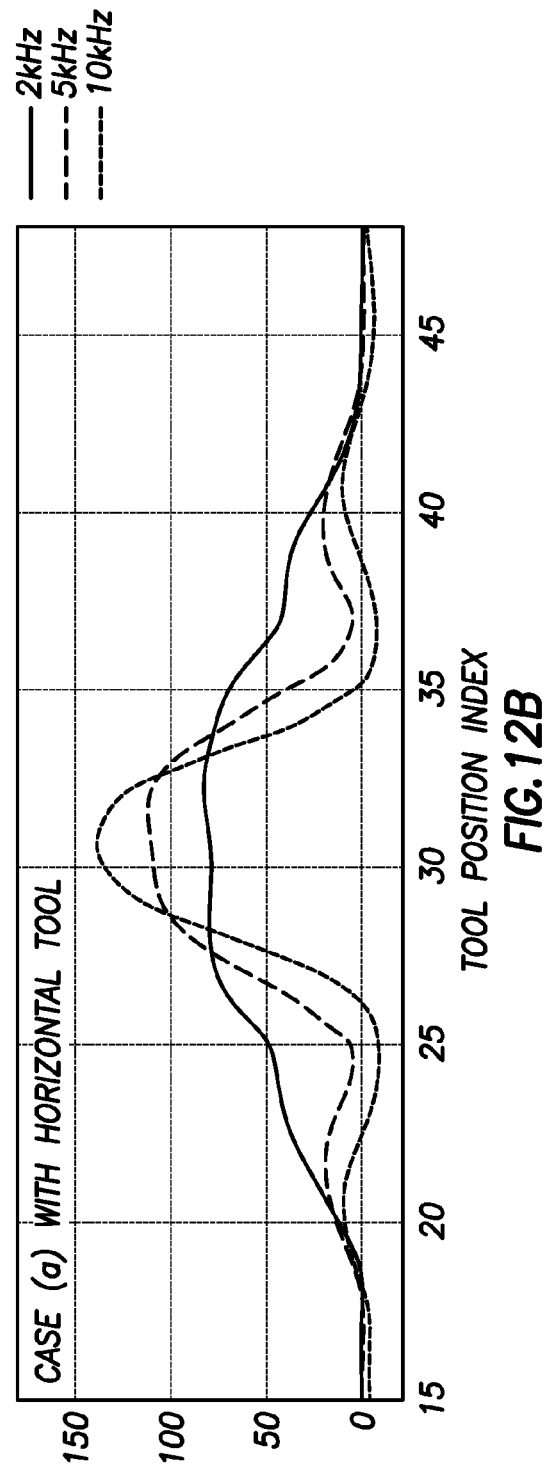
FIG.12A
FIG.12B

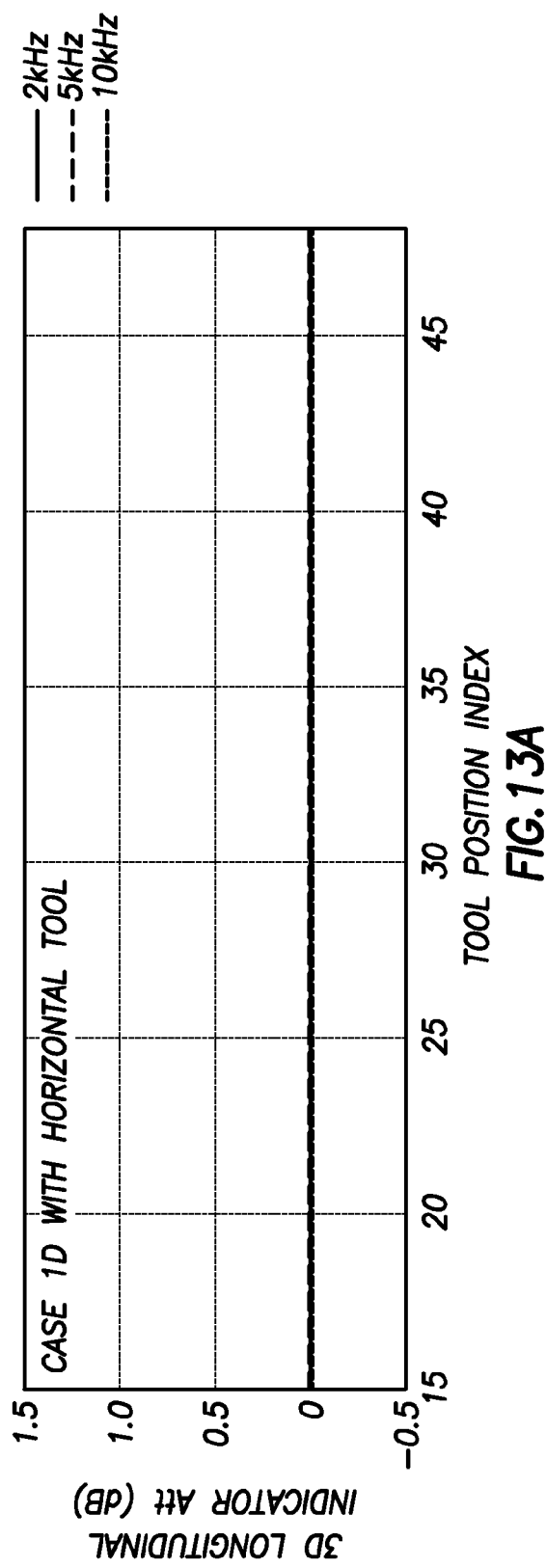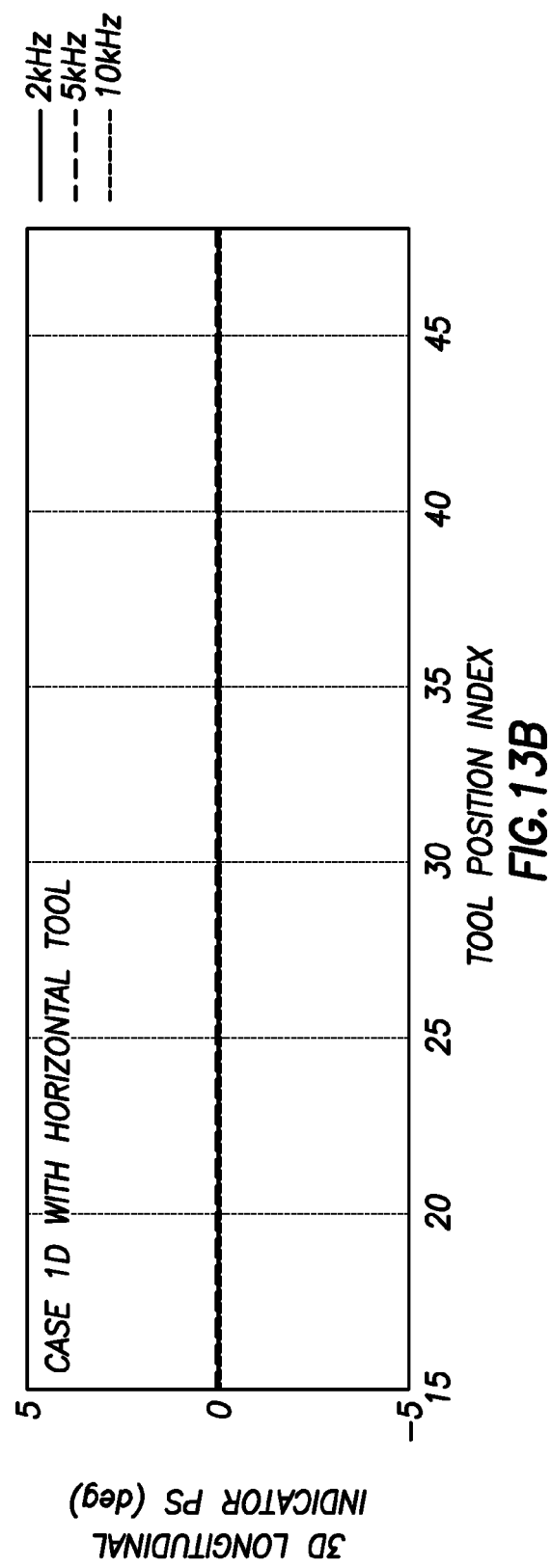

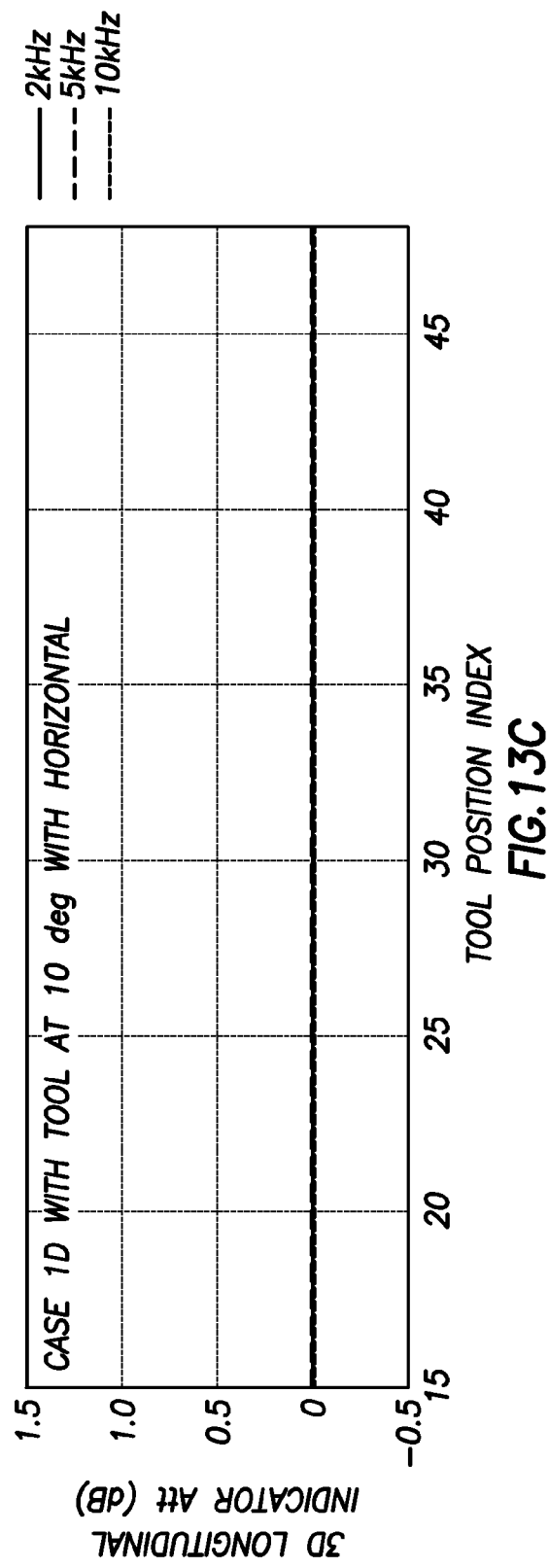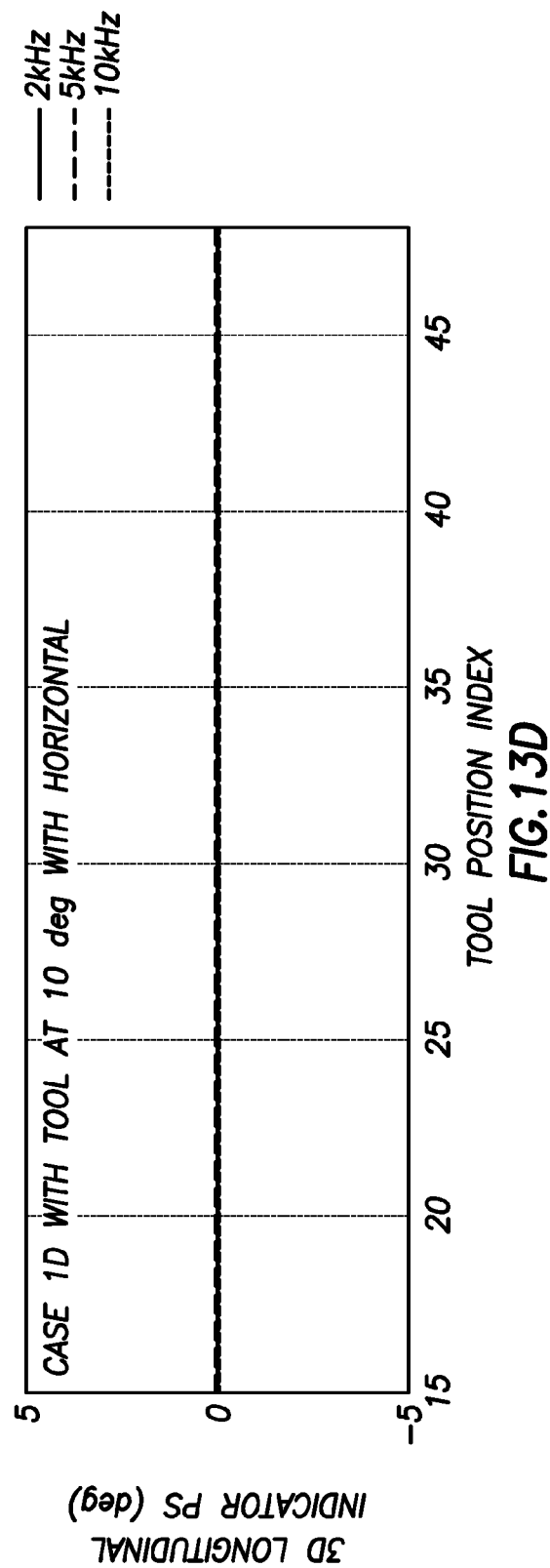

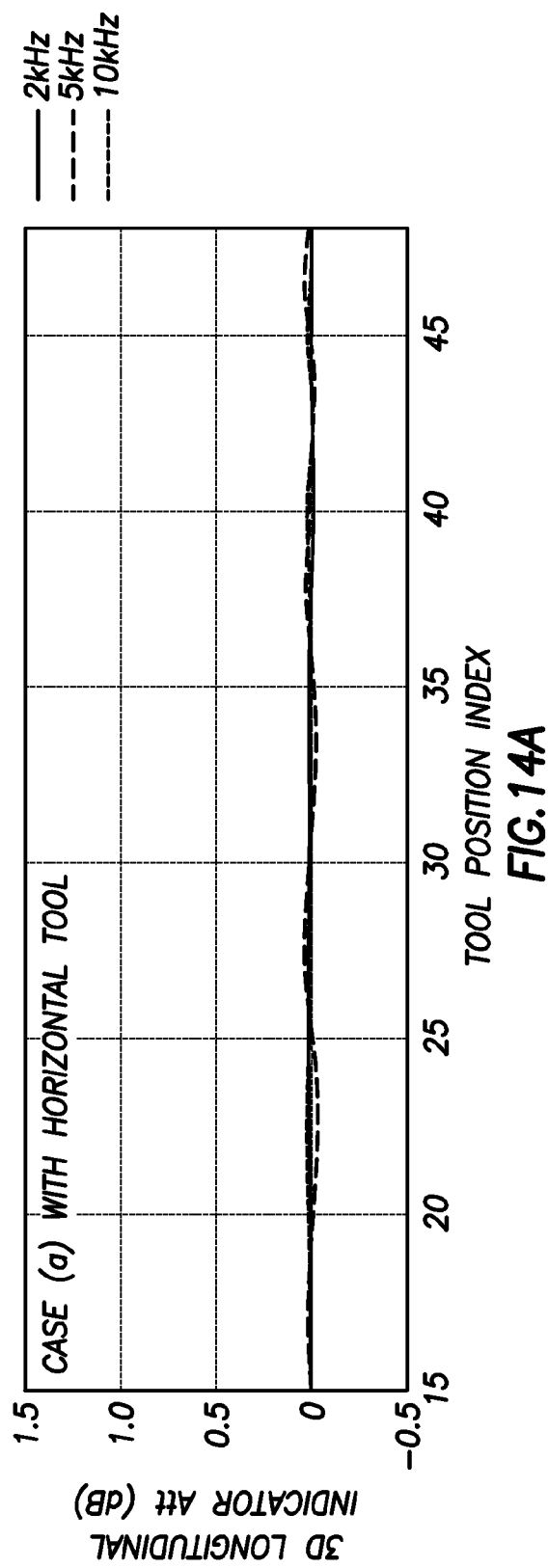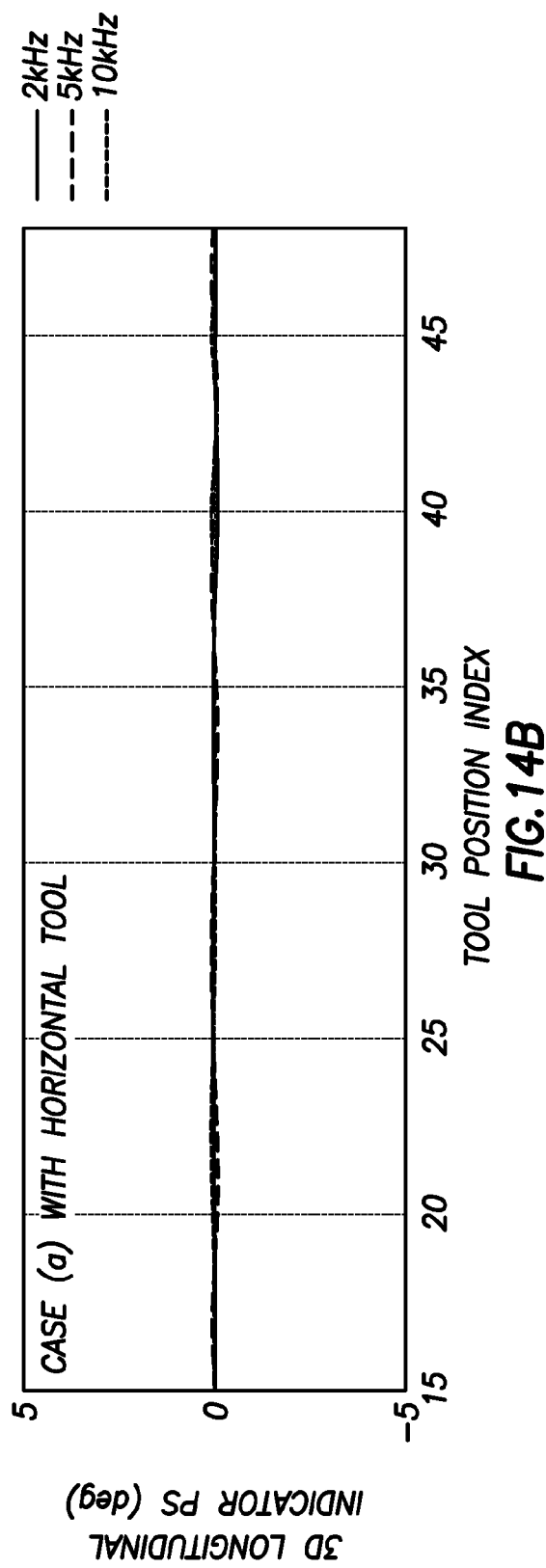

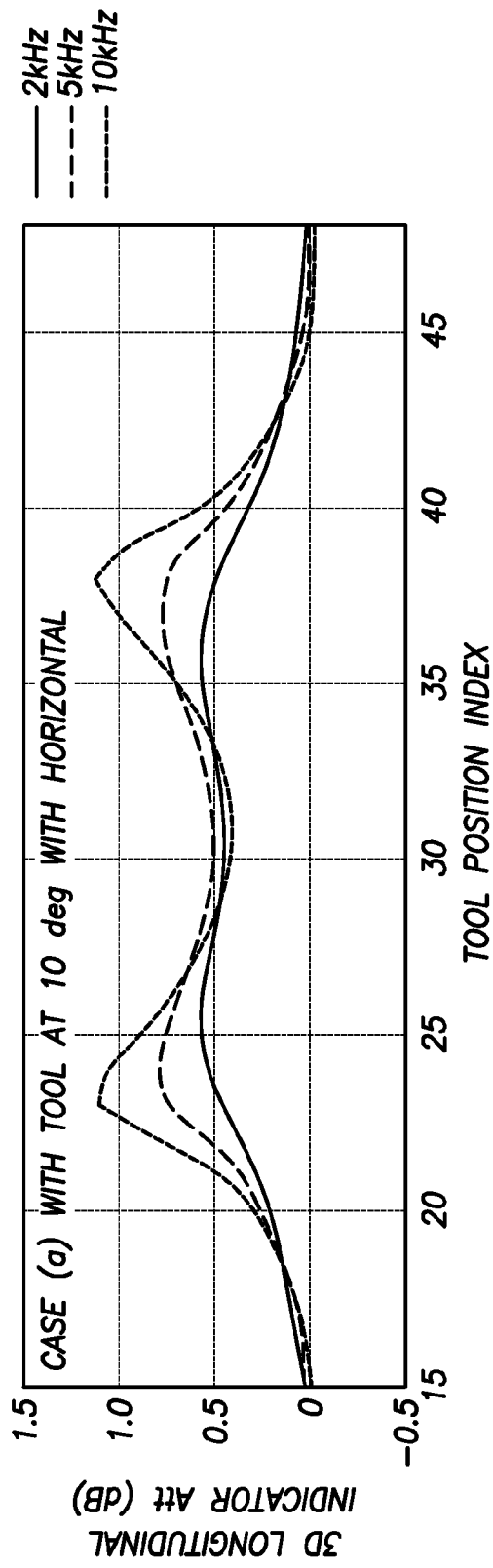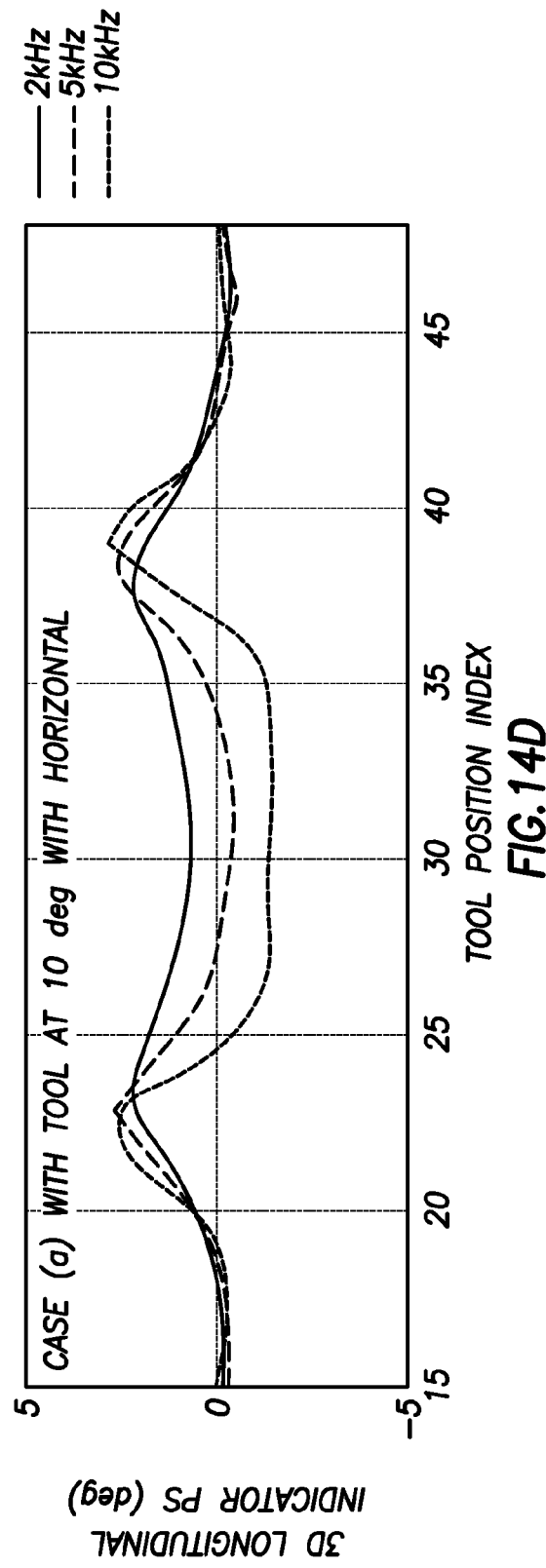

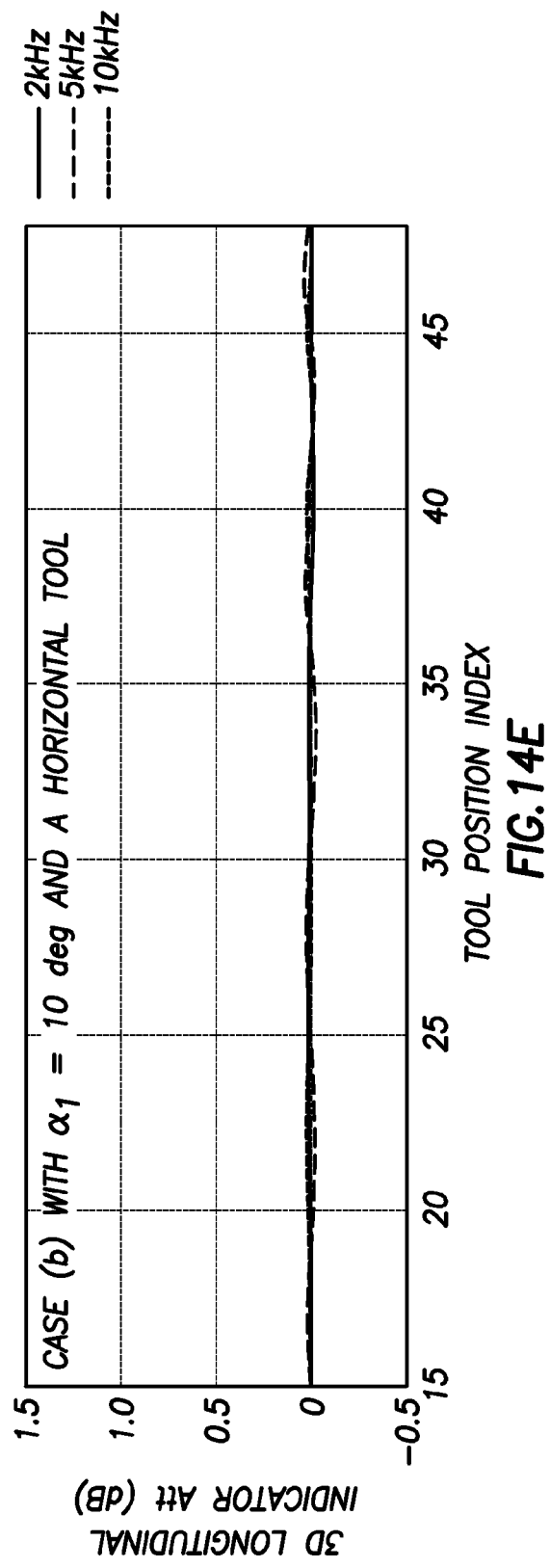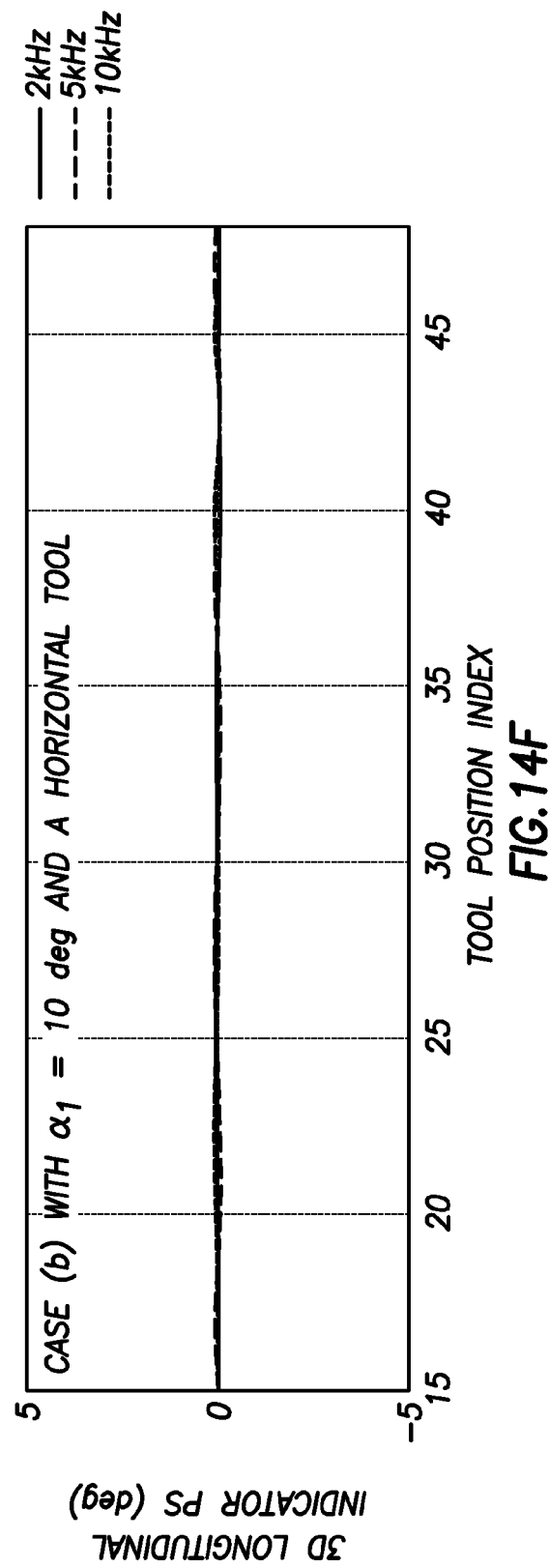
FIG.14E
FIG.14F

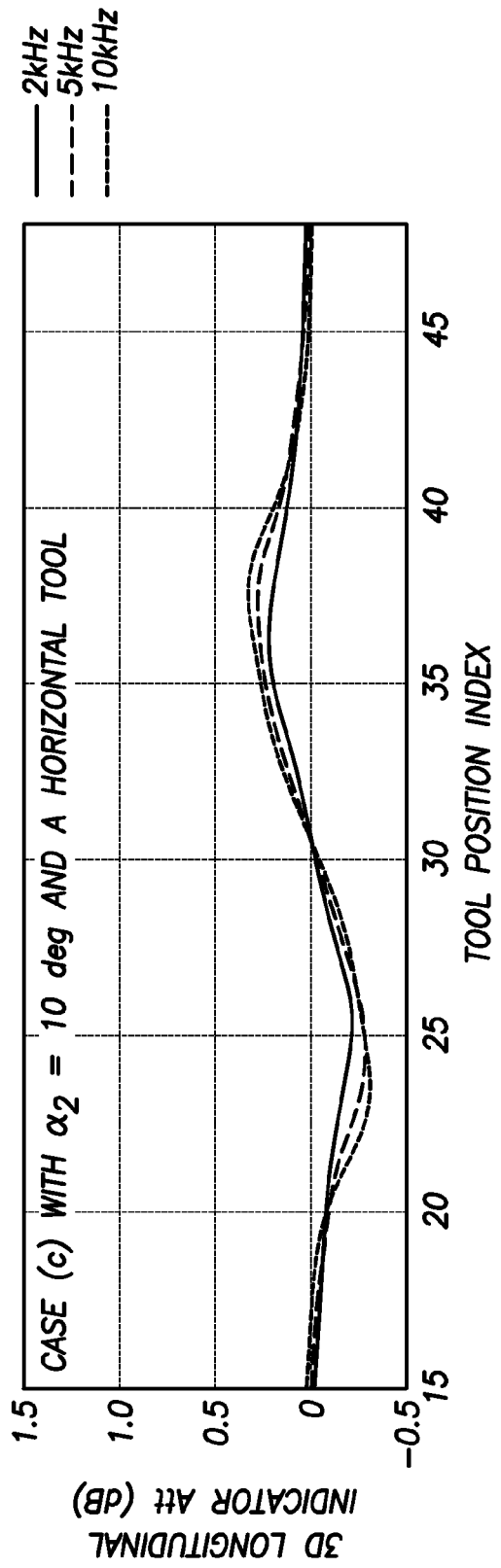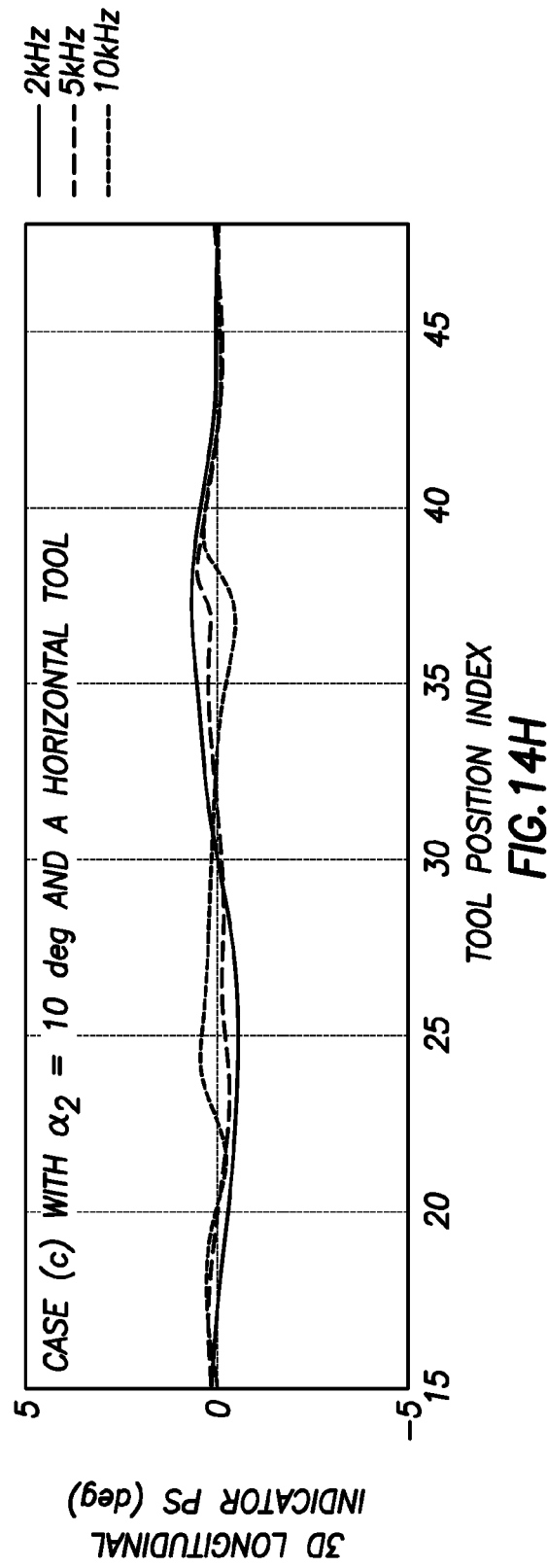

DETECTION OF 3D FORMATION STRUCTURES BASED ON ELECTRO-MAGNETIC COUPLING MEASUREMENTS

CROSS-REFERENCE TO OTHER APPLICATIONS

Not applicable.

BACKGROUND

1. Technical Field

The present application relates generally to electromagnetic logging of subsurface formations surrounding a wellbore using data obtained with a logging tool, and particularly to using coupling measurements obtained with an electromagnetic tool used to log while drilling.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used. Electromagnetic logging tools typically measure the resistivity (or its reciprocal, conductivity) of a formation. Prior art electromagnetic resistivity tools include galvanic tools, induction tools, and propagation tools. With propagation tools, typically a measurement of the attenuation and phase shift of an electromagnetic signal that has passed through the formation is used to determine the resistivity. The resistivity may be that of the virgin formation, the resistivity of what is known as the invasion zone, or it may be the resistivity of the wellbore fluid. In anisotropic formations, the resistivity may be further resolved into components commonly referred to as the vertical resistivity and the horizontal resistivity.

Early logging tools, including electromagnetic logging tools, were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have characteristics common to wireline tools (e.g., transmitting and receiving antennas), but MWD and LWD tools must be constructed to not only endure but to operate in the harsh environment of drilling.

Traditional electromagnetic (EM) measurements assume simple formation models to obtain quantitative measurements. For example, classical compensated resistivity assumes a vertical well and a homogeneous formation. In this case, the measured EM coupling can be related to an "apparent resistivity", that being the resistivity that would produce the same measured coupling. This relation or, more particularly, this transform assumes the formation to be homogeneous. If that assumption is not the true, then the apparent reading must be corrected (e.g., shoulder bed correction, invasion correction, etc.).

Recently, deep directional EM tools have been implemented that measure the off-diagonal terms of the EM or coupling tensor. Based on those measurements, new quantities have been derived, called "Symmetrized Directional" (SD) measurements or responses, that indicate the presence of a resistivity contrast. This measurement applies well to cases in which the formation comprises parallel layers of contrasting resistivities. It is possible to use those measurements to compute the distance to a boundary of contrasting resistivity and the change in conductivity. However, from just this information, it is impossible to determine if the formation has parallel boundaries between layers or if its geometry is more complicated.

If a tool has enough coils (i.e., antennas) with different orientations at two points, it is possible to measure the whole set of EM-couplings between those two points. However, interpreting those raw couplings can be very tedious, particularly with complicated geometries. Interpretation is currently practical for cases in which the formation is assumed to have parallel layers (1-D formation). In vertical wells, classical compensated resistivities are useful, and in horizontal wells, Symmetrized Directional measurements are good indicators of distance to boundaries. So, in conjunction with bulk resistivity measurements, it is possible to estimate a formation resistivity distribution. However, this technique does not apply if the formation is not 1-D.

SUMMARY

The present disclosure relates to a method to determine a characteristic of a subsurface formation using electromagnetic coupling components. A downhole logging tool having one or more transmitters and one or more receivers, and being capable of measuring the electromagnetic coupling components is provided. The electromagnetic coupling components are measured using the downhole logging tool and used to form a 3-D Lateral Indicator and/or a 3-D Longitudinal Indicator. The 3-D Lateral Indicator and/or the 3-D Longitudinal Indicator are used to determine the characteristic of the subsurface formation.

Other aspects and advantages will become apparent from the following description and the attached claims.

BRIEF DESCRIPTION OF THE FIGURES

FIGS. 4A and 4B are amplitude and phase logs, respectively, of SD responses for an "equivalent" 1-D problem.

FIGS. 5A and 5B are amplitude and phase logs, respectively, of SD responses for a wedge angle of 5 degrees, and FIGS. 5C and 5D are amplitude and phase logs, respectively, of SD responses for a wedge angle of 30 degrees.

FIGS. 6A and 6B are amplitude and phase logs, respectively, of a 3-D Lateral Indicator for an "equivalent" 1-D problem.

FIGS. 7A and 7B are amplitude and phase logs, respectively, of a Lateral 3-D Indicator for a wedge angle of 5 degrees, and FIGS. 7C and 7D are amplitude and phase logs, respectively, of a Lateral 3-D Indicator for a wedge angle of 30 degrees.

FIGS. 9A and 9B are amplitude and phase logs, respectively, of SD responses for 1-D cases (regions 1, 2, and 3 of infinite extent) using a horizontal tool.

FIGS. 12A and 12B are amplitude and phase logs, respectively, of a 3-D Lateral Indicator for case (a) of FIG. 8 using a horizontal tool.

FIGS. 13A and 13B are amplitude and phase logs, respectively, of a 3-D Longitudinal Indicator for 1-D cases (regions 1, 2, and 3 of infinite extent) using a horizontal tool, and FIGS. 13C and 13-D are amplitude and phase logs, respectively, of a 3-D Longitudinal Indicator for 1-D cases using a tool making an angle of 10 degrees relative to a horizontal plane.

FIGS. 14A and 14B are amplitude and phase logs, respectively, of a 3-D Longitudinal Indicator for case (a) of FIG. 8 using a horizontal tool, and FIGS. 14C and 14D are amplitude and phase logs, respectively, of a 3-D Longitudinal Indicator for case (a) of FIG. 8 using a tool making an angle of 10 degrees relative to a horizontal plane.

FIGS. 14E and 14F are amplitude and phase logs, respectively, of a 3-D Longitudinal Indicator for case (b) of FIG. 8 with $\alpha_1$ equal to 10 degrees and using a horizontal tool, and FIGS. 14G and 14H are amplitude and phase logs, respectively, of a 3-D Longitudinal Indicator for case (c) of FIG. 8 with $\alpha_2$ equal to 10 degrees and using a horizontal tool.

It is to be understood that the drawings are to be used to understand various embodiments and/or features. The figures are not intended to unduly limit any present or future claims related to this application.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
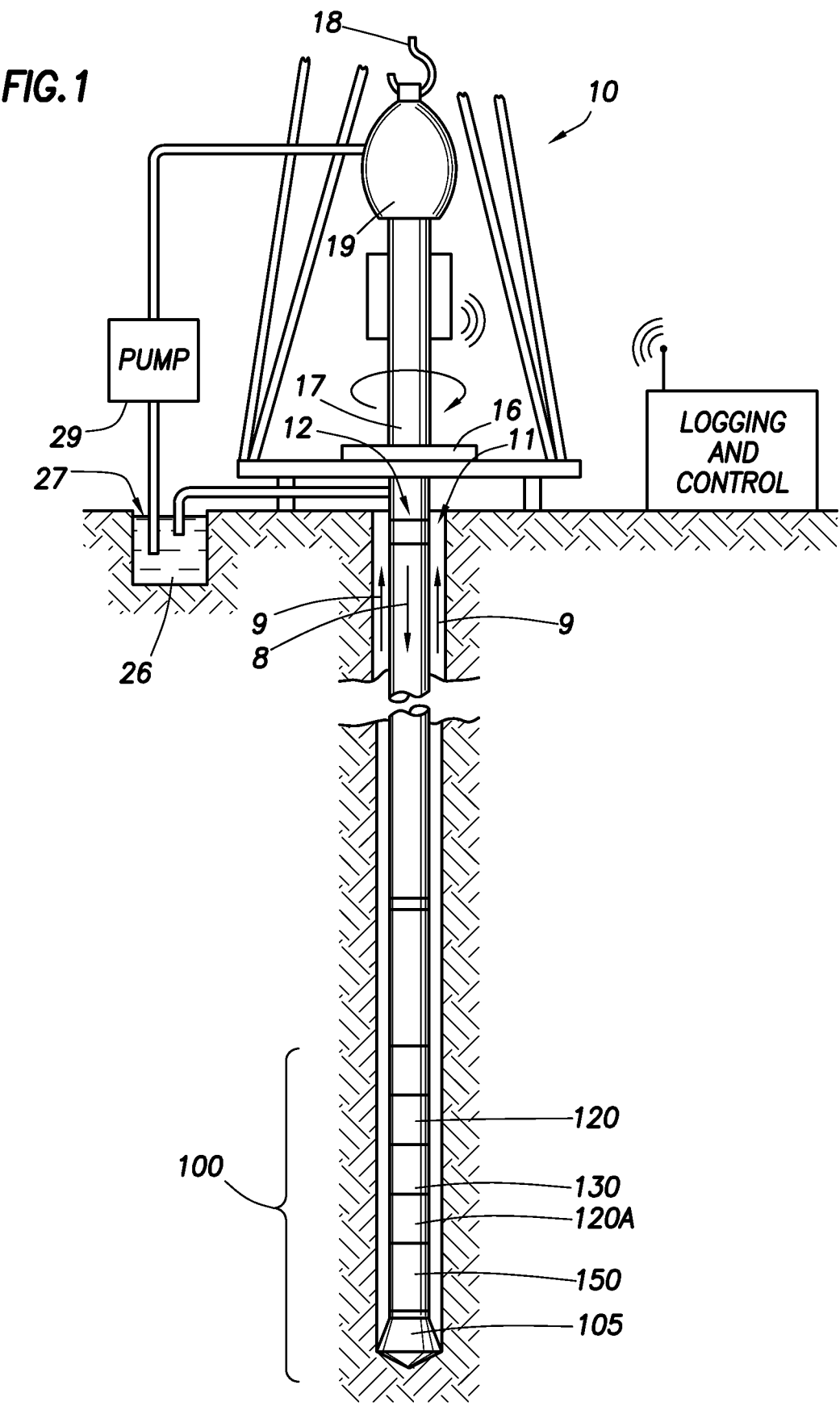
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
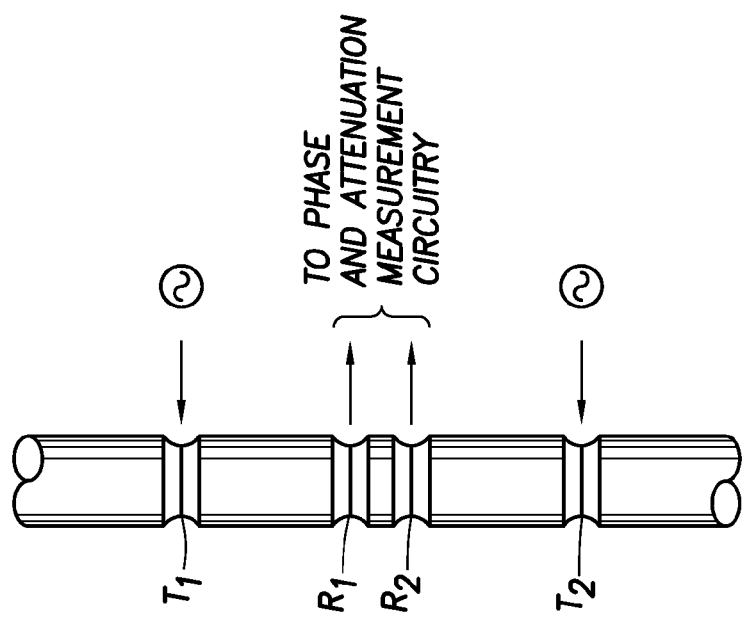
FIG. 2 shows a prior art electromagnetic logging tool.

An example of a tool which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining formation Resistivity At A Shallow And A Deep Depth," incorporated herein by reference. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Newly defined measurements or responses can distinguish between 1-D and 3-D cases and provide quantitative information on the 3-D character of the formation. Those measurements can be fully self-calibrated, meaning that any imperfection in coils, excitation current, electronic gain, etc. will be automatically corrected. In addition, 1-D and 3-D effects can be separated, allowing advanced interpretation that is otherwise very tedious using raw EM couplings (tensor components).

The inductive electromagnetic coupling between two points in space is a tensor. It depends on the orientations of the transmitting coil(s) and the receiving coil(s). Note, for ease of discussion, the term "coil" is used in this description, but other antenna types can be used. A full tensor can be measured, for example, by placing three coils with different orientations at a transmitting point and three coils at a receiving point, or by using a tool with fewer coils, but that rotates.

Various antenna configurations are possible, such as three transmitting antennas and one receiving antenna, two transmitters and two receivers, or one transmitter and three receivers.

Components of the EM tensor can be used to construct quantities that will characterize certain geometrical properties of the formation. For example, one such quantity can indicate whether the logging tool is in a plane of symmetry of the formation. Such an indicator will be referred to herein as a 3-D Lateral Indicator. Another quantity can indicate whether a change in lateral resistivity remains unchanged when the logging tool, for example by virtue of re-configuring the antenna arrangement, is effectively rotated around an axis (e.g., the x-axis) normal to the tool axis (i.e., the z-axis) by 180 degrees. Such an indicator will be referred to herein as a 3-D Longitudinal Indicator.

Investigation into how those couplings, or quantities defined in terms of those couplings, change when the tool rotates around its longitudinal axis (conventionally, the z-axis) or when the tool is "flipped" in direction (i.e., if the z-axis is the longitudinal axis of the tool, replacing z by −z) can yield useful information about the surrounding formation. For rotation about the longitudinal axis, we can classify the couplings into at least three categories:

1) Quantities that are rotationally invariant (called DC-measurements):

$$(zz), \frac{(xx)+(yy)}{2}, \frac{(xy)-(yx)}{2};$$

2) Quantities that change sign after a rotation of 180 degrees (called 1H-measurements): (xz), (zx), (yz), (zy); and 3) Quantities that change sign after a rotation of 90 degrees (called 2H-measurements):

$$\frac{(xx)-(yy)}{2}, \frac{(xy)+(yx)}{2}.$$

Note, the convention used herein is to represent the coupling tensor component by its row and column designations or indices. For example, (zz) represents the (3, 3) component and (yx) represents the (2, 1) component.

Any linear combination of measurements from the same category retains the characteristic property of that category. The ratio of a 1H-measurement and a DC-measurement behaves as a 1H-measurement, and the ratio of a 1H-measurement and a 2H-measurement behaves as a 2H-measurement. If the tool, its longitudinal axis being the z-axis, is flipped 180 degrees about its x-axis, we replace z with (−z) and y with (−y); x remains unchanged. Under this rotation of coordinates, the basis function retains the same orientation conventions. Through this transform, measurements either remain identical or change sign. A summary of how certain measurements transform is presented in Table 1:

TABLE 1

| | (zz) | $\frac{(xx)+(yy)}{2}$ | $\frac{(xy)-(yx)}{2}$ | (xz) | (zx) | (yz) | (zy) | $\frac{(xx)-(yy)}{2}$ | $\frac{(xy)+(yx)}{2}$ |
|---|---|---|---|---|---|---|---|---|---|
| Sign change after transform | + | + | − | − | − | + | + | + | − |

Those properties can be related to the spatial sensitivities of those measurements. For example, DC-measurements are independent of the rotation of the tool. If, in addition, they do not depend on the orientation of the tool-axis, they are bulk resistivity measurements; (zz) and $$\frac{(xx)+(yy)}{2}$$

are such measurements.

Both 1H-measurements and 2H-measurements depend on the coordinate system used. Per convention, the tool coordinate system is rotated so as to minimize all couplings in the y-direction (e.g., (zx), (zy) and $$\left(\text{e.g., } (zx), (zy) \text{ and } \frac{(xy)+(yx)}{2}\right).$$

We assume in the description below that this rotation has been performed.

Given certain conditions or assumptions, various properties can be logically inferred. For example, if the tool axis is an axis of symmetry, rotating the tool by 180 degrees does not change the reading for a 1H-measurement. Similarly, rotating the tool by 90 degrees does not change the reading for a 2H-measurement. We know, however, that 1H-measurements and 2H-measurements should change sign under those respective rotations. Thus, their only possible value is zero. Homogeneous isotropic formations, layered formations crossed by a vertical well, and hill-shaped formations with the borehole on the axis of symmetry are examples of formations that would exhibit this property, referred to herein as "Property 1". For those cases, all 1H- or 2H-measurements will have zero readings.

If the plane passing through the z-axis and the x-axis is a plane of symmetry, a rotation of 180 degrees should change the sign of the minimum value of a 1H-measurement such as (yz) and (zy). By similar logic as above, both must be zero in this case. This property is referred to herein as "Property 2". Similarly, if a formation is "flip-invariant" along the z-axis of the tool, then the measurements that flip sign through a z-flip must be zero. That is the case, for example, for $$\frac{(xy)-(yx)}{2}.$$

This property is referred to herein as "Property 3". Using Property 2, one can devise a 3-D Lateral Indicator, and using Property 3, one can devise a 3-D Longitudinal Indicator.

A 3-D Lateral Indictor can be constructed in a manner similar to a SD measurement:

$$3D\_lateral = \frac{(zz)+(zy)}{(zz)-(zy)} \cdot \frac{(zz)-(yz)}{(zz)+(yz)}$$

This measurement will detect any departure from a situation in which the plane (x, z) is a plane of symmetry. Simulation shows that this measurement can split the 3-D effect based on the superposition of equivalent perpendicular contributions.

Figure 3:
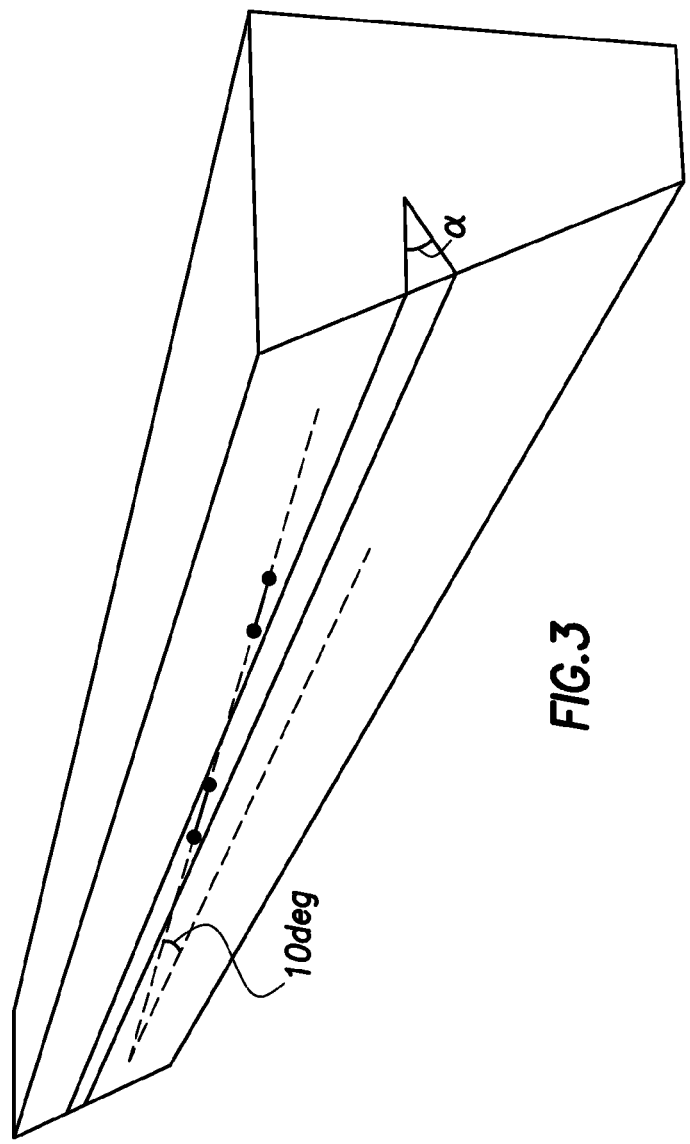
FIG. 3 shows a 3-D view of a wedge cut by a plane containing an electromagnetic logging tool. The wedge is formed of two non-parallel planes. The tool is going down with an angle of 10 degrees relative to the horizontal plane.

To evaluate the performance of the 3-D Lateral measurement, one can simulate a formation having a constant background resistivity and a wedge filled with another resistivity. The wedge is delimited by two planes that are not parallel and in which their intersection is perpendicular to each of their normal vectors, as shown in FIG. 3. Several cases of resistivities and angles between the planes were simulated to evaluate the impact of those parameters on the tool's measurements. FIGS. 4A, 4B, and 5A-5D show the SD measurement remains insensitive to a strong 3-D effect, independent of the angle between boundaries. The readings are unchanged from those one would obtain from a 1-D layered formation. The 3-D_lateral quantity, however, increases with the angle between the two boundaries, as shown in FIGS. 6A, 6B, and 7A-7D. The computed value represents the resistivity contrast in the y-axis direction. Its sign is representative of the contrast and its amplitude informs us about the strength of the effect, which in turn can be transformed into an "equivalent lateral distance".

One can exploit Property 3 to devise a Longitudinal 3-D Indicator measurement or response, such as:

$$3D\_longitudinal = \frac{[(xx)+(yy)]+[(xy)-(yx)]}{[(xx)+(yy)]-[(xy)-(yx)]}.$$

This indicator equals one in a 1-D formation. The difference [xy−yx] is different from zero in some 2-D or 3-D cases, but does equal zero in some specific 3-D formations, such as when the formation is symmetrical with a flip of the tool.

Figure 8:
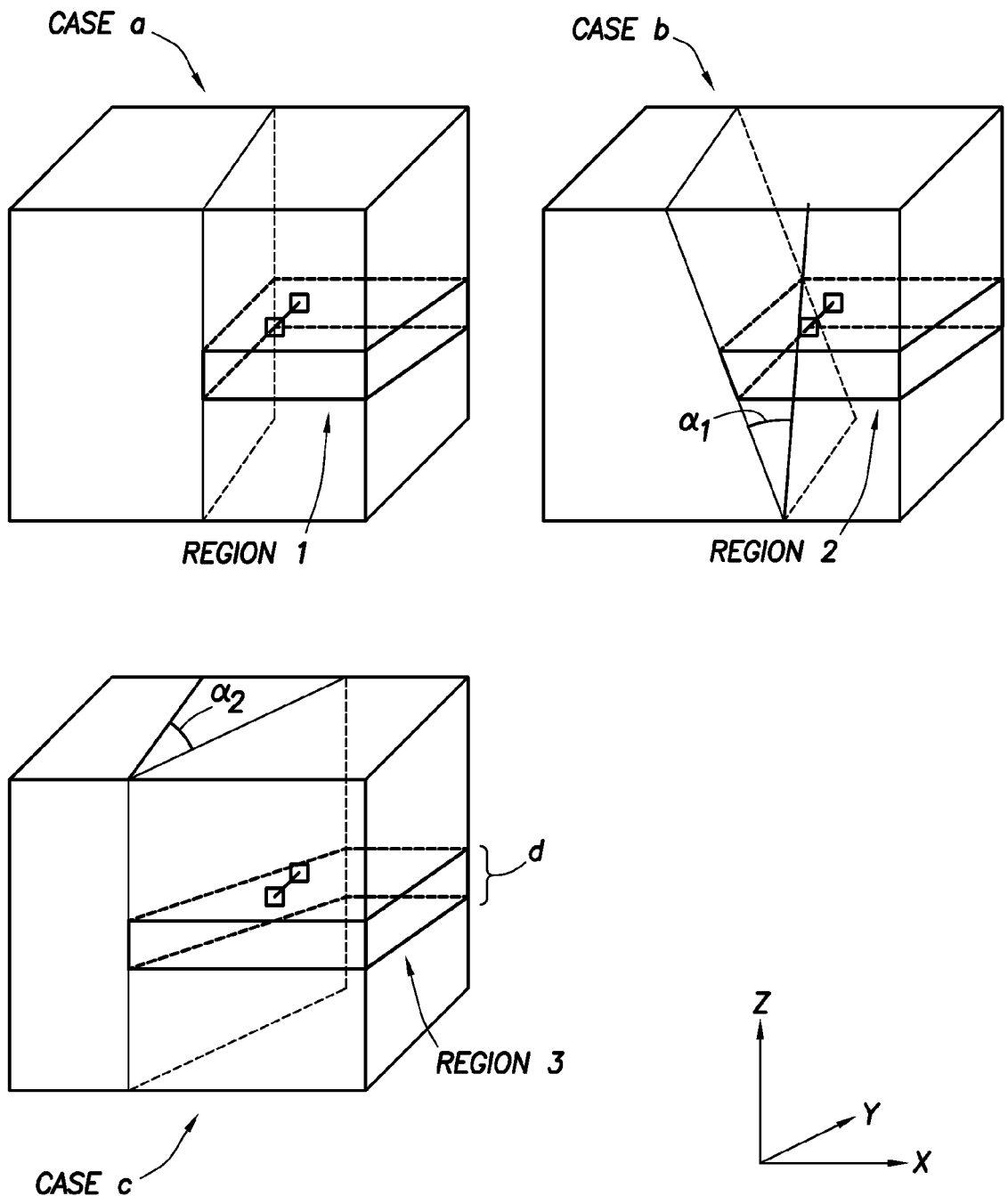
FIG. 8 is a schematic view of three cases (a, b, and c) of a formation corner having different configurations of "vertical" planes.
Figure 9C:
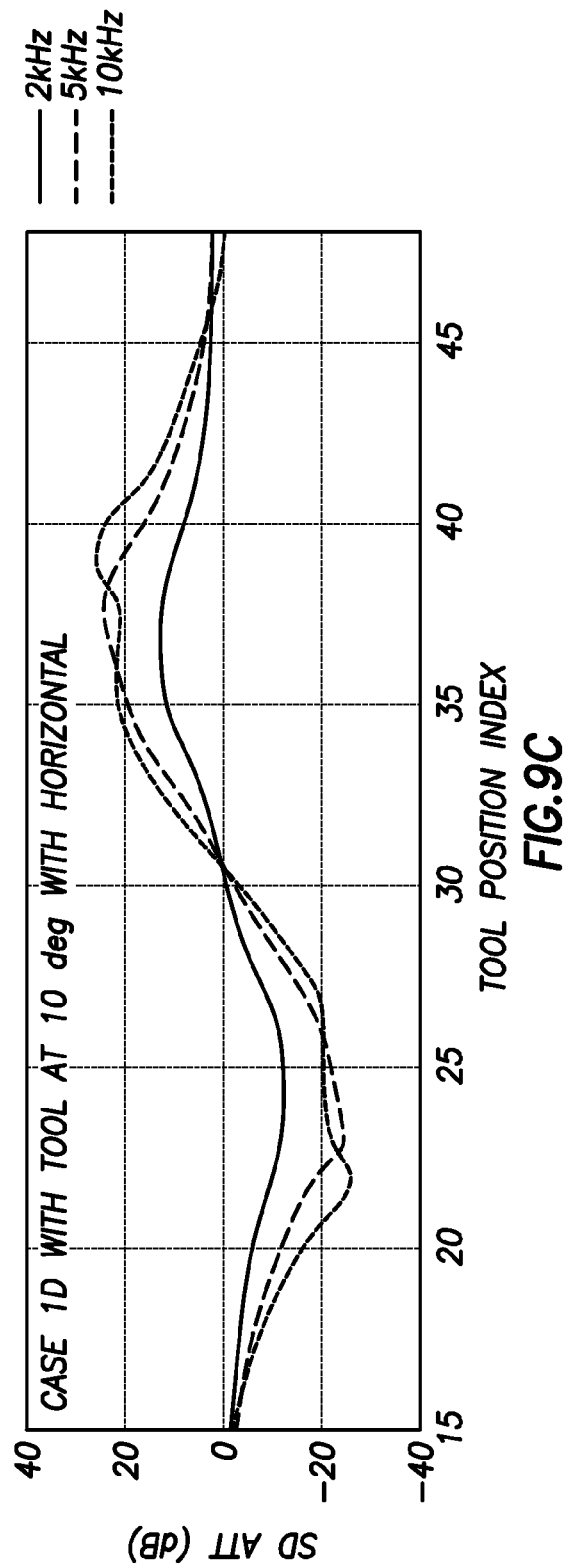
FIGS. 9C and 9D are amplitude and phase logs, respectively, of SD responses for 1-D cases using a tool making an angle of 10 degrees relative to a horizontal plane.
Figure 9D:
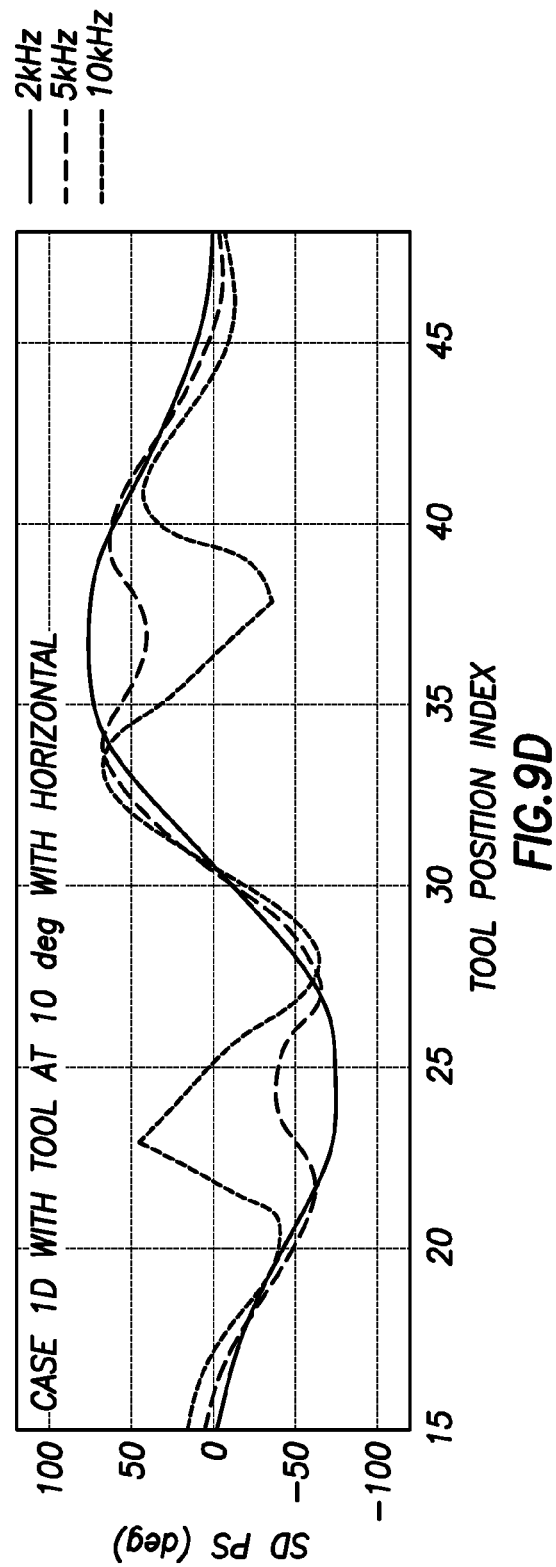

To evaluate this indicator, one can simulate a formation having a background resistivity and a "corner" (e.g., regions 1, 2, and 3 of FIG. 8) filled with material having another resistivity. Several configurations of tool and corner geometry have been investigated. The corner is delimited by three planes: two planes normal to Z-direction of the formation, separated some distance "d", and a third "vertical" plane, either parallel to the (Y, Z) plane (FIG. 8, Case (a)), a (Y, Z) plane rotated an angle $\alpha_1$ about the Y-axis (FIG. 8, Case (b)), or a (Y, Z) plane rotated an angle $\alpha_2$ about the Z-axis (FIG. 8, Case (c)). Various measurements for different heights of the tool above, inside, and below the corner were simulated, with the tool being either horizontal or angled slightly relative to horizontal.

The above examples of a 3-D Lateral Indicator and a 3-D Longitudinal Indicator are exemplary only. The properties described above can be exploited to produce other such indicators using other combinations of the electromagnetic coupling tensor components.

Figure 15:
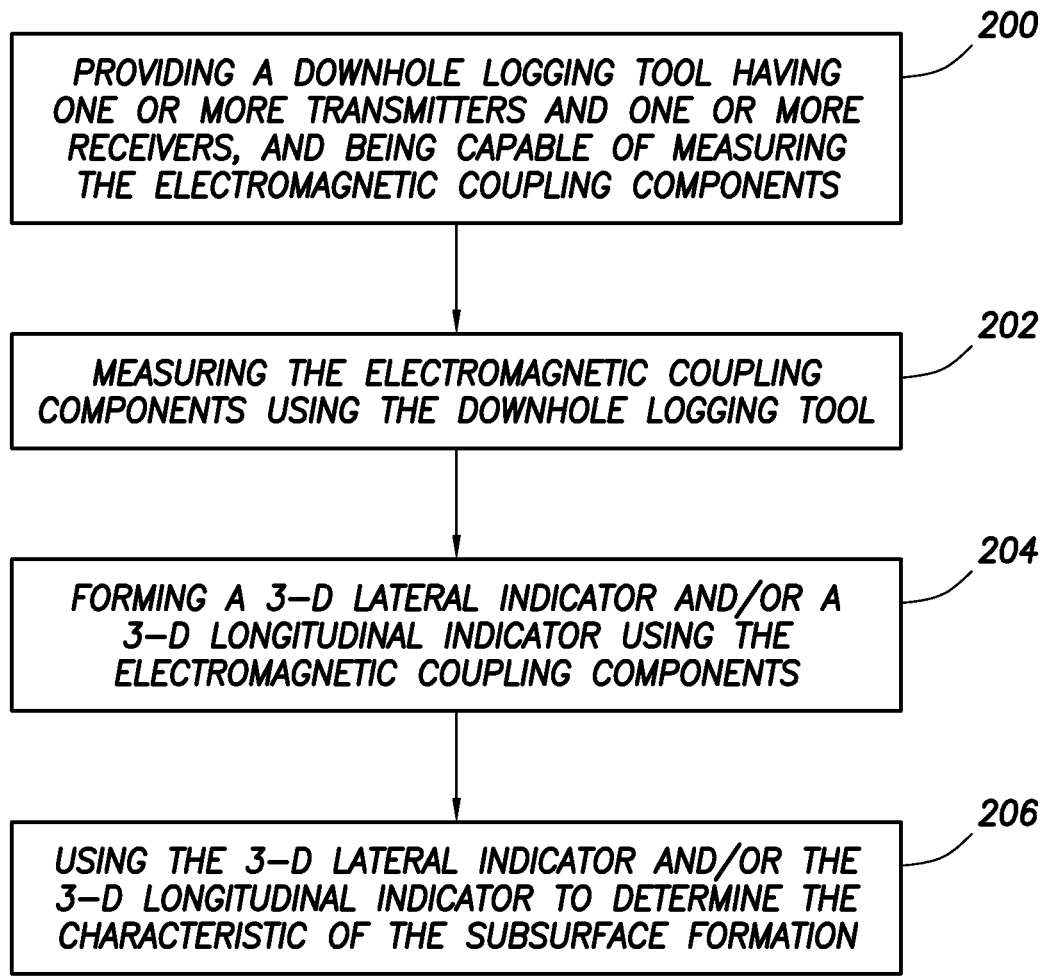
FIG. 15 is a flowchart showing an exemplary embodiment to determine a characteristic of a subsurface formation using electromagnetic coupling components.

FIG. 15 is a flowchart showing an exemplary embodiment to determine a characteristic of a subsurface formation using electromagnetic coupling components. In step 200, a downhole logging tool having one or more transmitters and one or more receivers, and being capable of measuring the electromagnetic coupling components, is provided. The electromagnetic coupling components are measured using the downhole logging tool (step 202) and a 3-D Lateral Indicator and/or a 3-D Longitudinal Indicator is formed using the electromagnetic coupling components (step 204). In step 206, the 3-D Lateral Indicator and/or the 3-D Longitudinal Indicator are used to determine the characteristic of the subsurface formation.

Figure 10A:
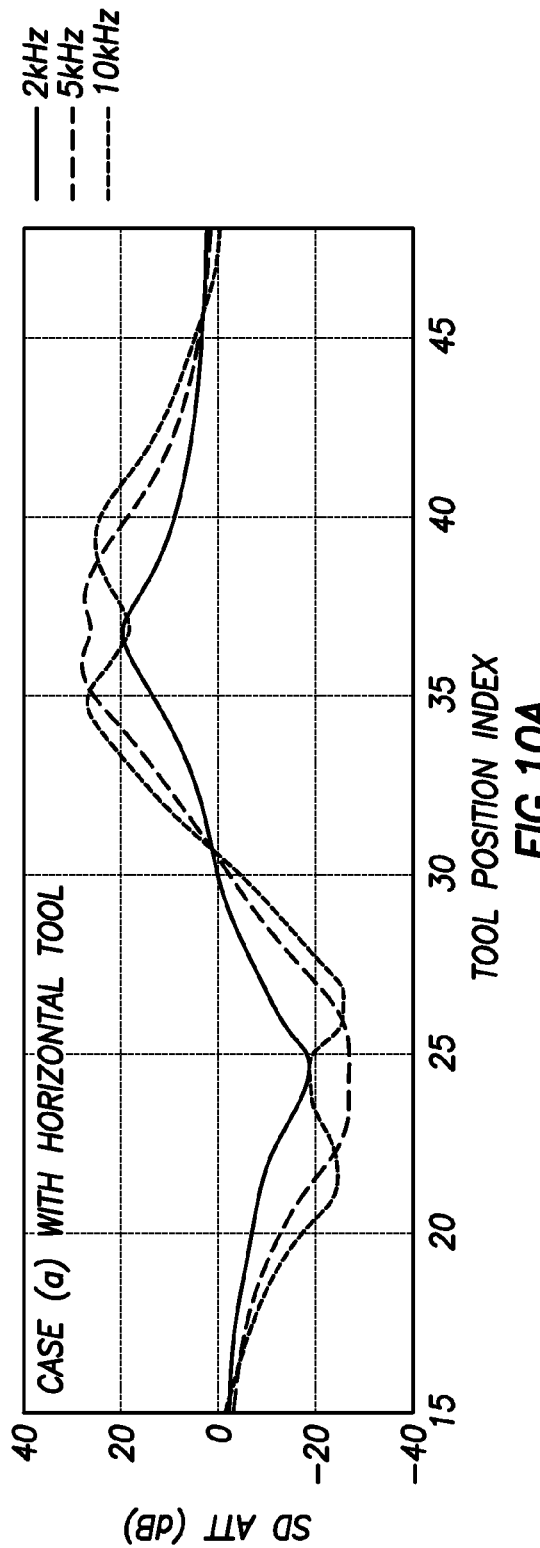
FIGS. 10A and 10B are amplitude and phase logs, respectively, of SD responses for case (a) of FIG. 8 using a horizontal tool.
Figure 10B:
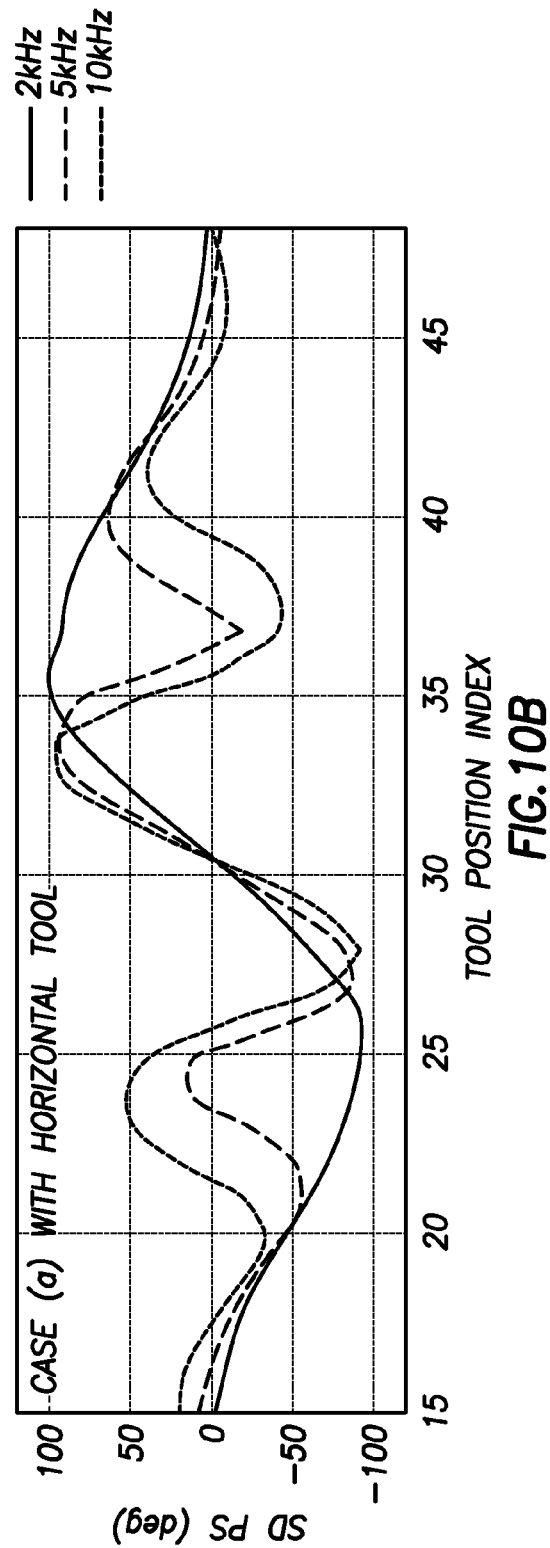
Figure 10C:
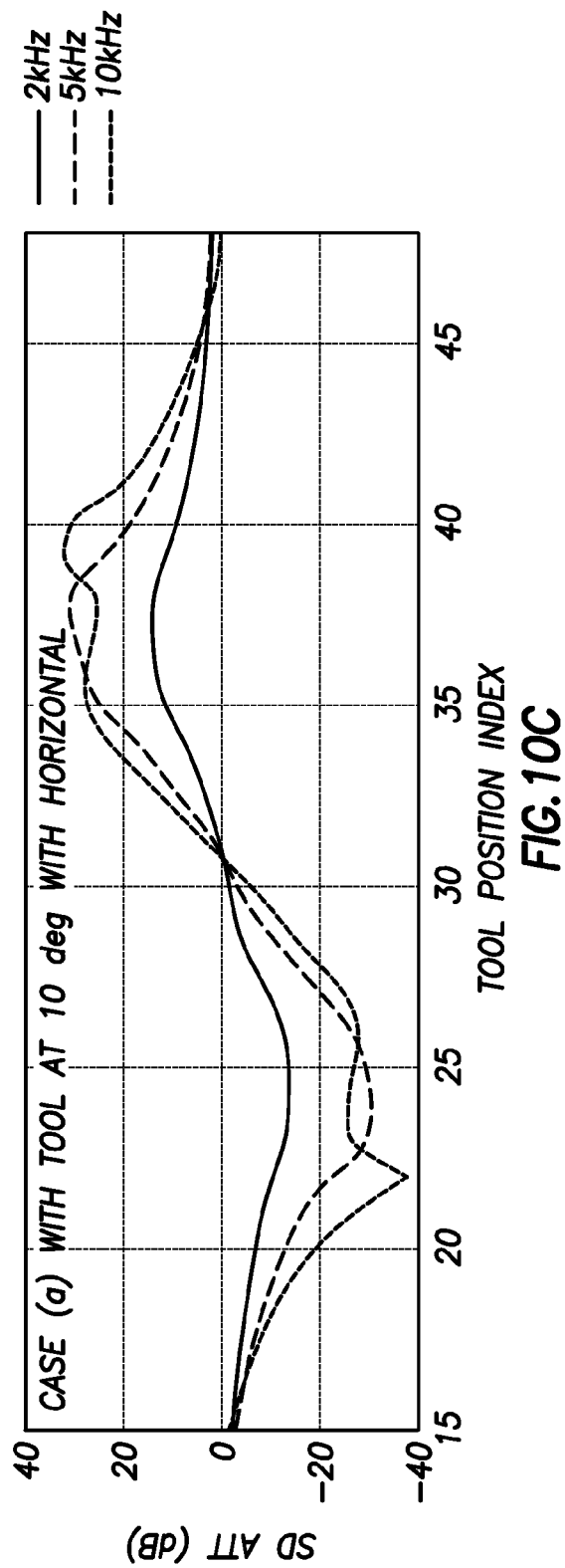
FIGS. 10C and 10D are amplitude and phase logs, respectively, of SD responses for case (a) of FIG. 8 using a tool making an angle of 10 degrees relative to a horizontal plane.
Figure 10D:
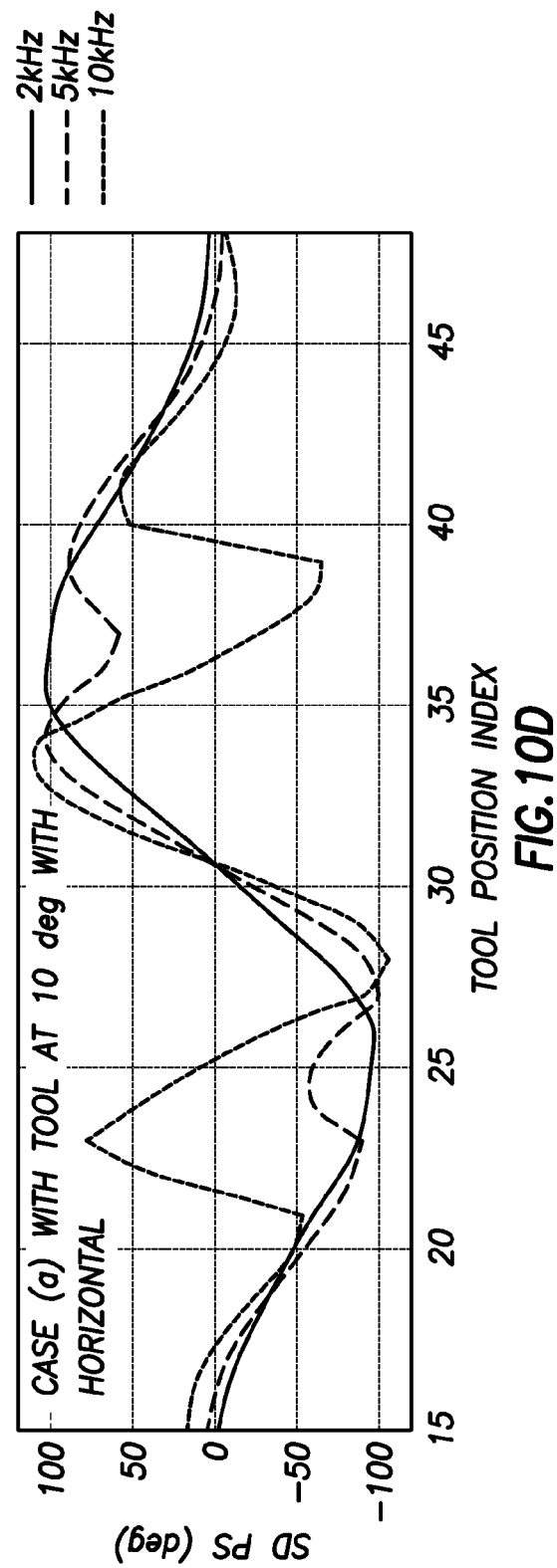
Figure 10E:
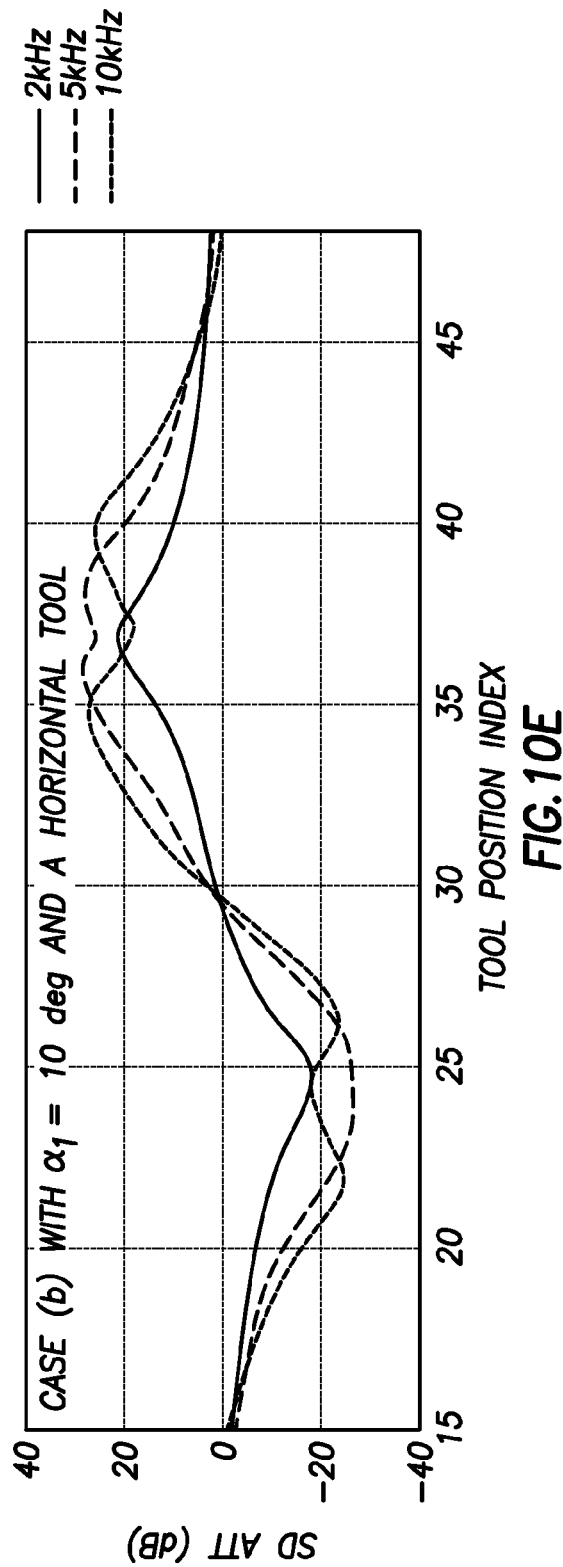
FIGS. 10E and 10F are amplitude and phase logs, respectively, of SD responses for case (b) of FIG. 8 with $\alpha_1$ equal to 10 degrees and using a horizontal tool.
Figure 10F:
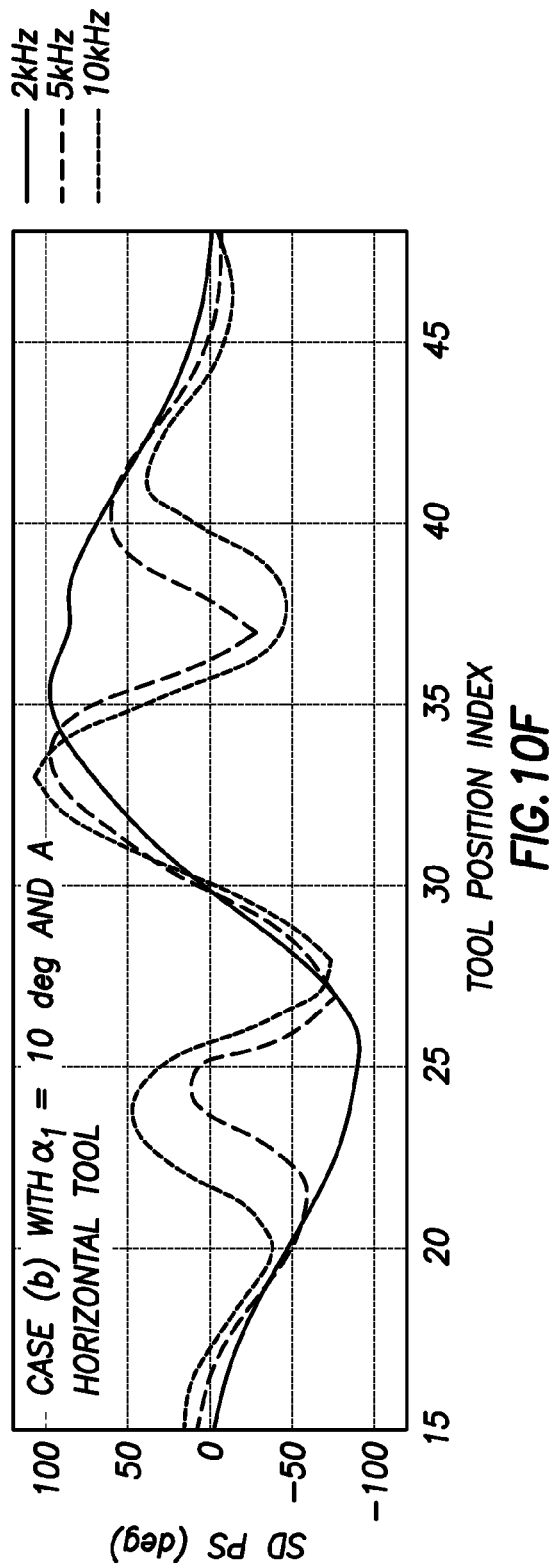
Figure 10G:
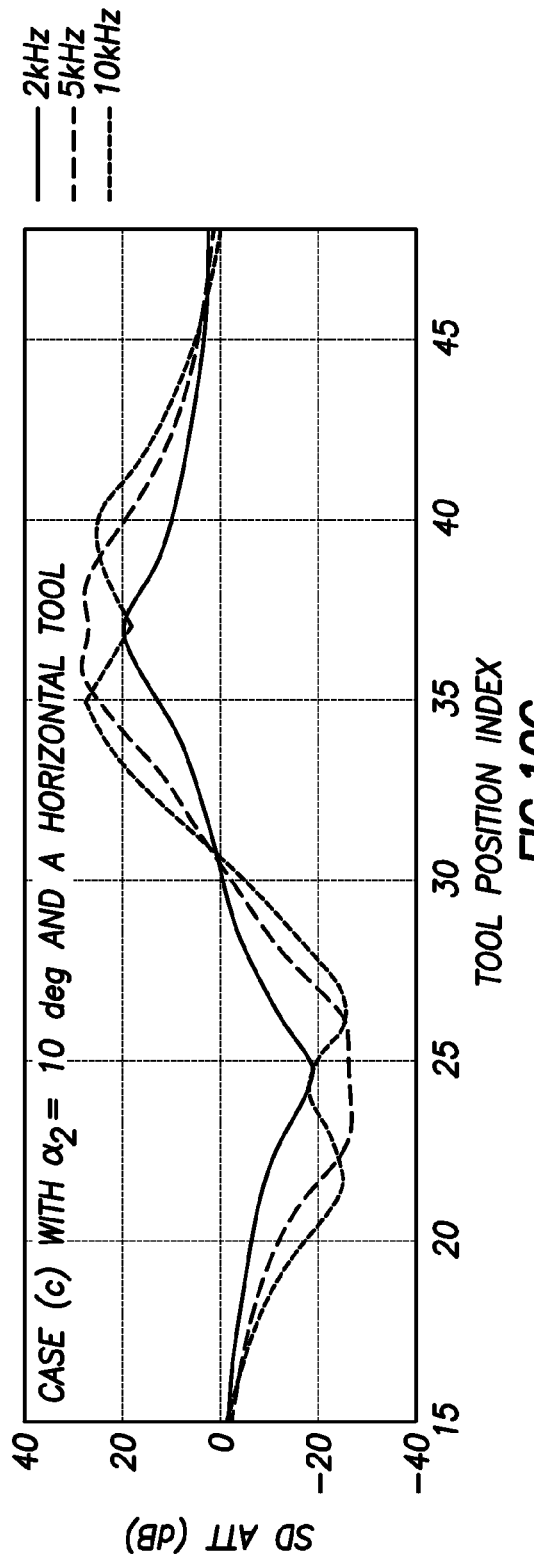
FIGS. 10G and 10H are amplitude and phase logs, respectively, of SD responses for case (c) of FIG. 8 with $\alpha_2$ equal to 10 degrees and using a horizontal tool.
Figure 10H:
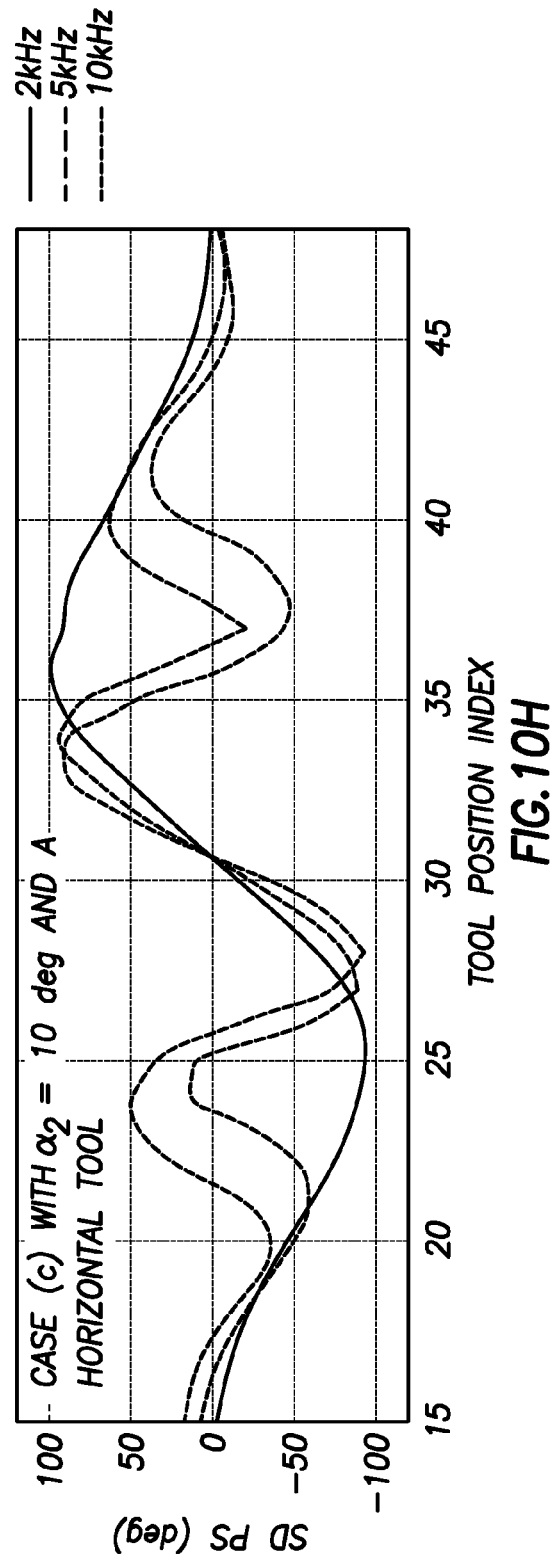
Figure 11C:
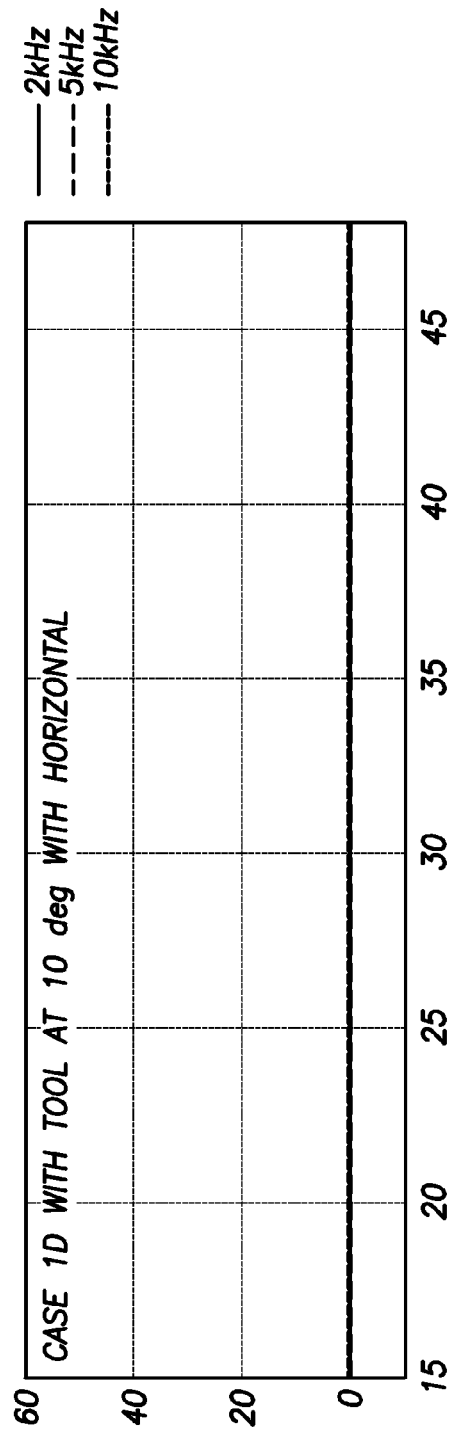
FIGS. 11A and 11B are amplitude and phase logs, respectively, of a 3-D Lateral Indicator for 1-D cases (regions 1, 2, 3 of infinite extent) using a horizontal tool, and FIGS. 11C and 11-D are amplitude and phase logs, respectively, of a 3-D Lateral Indicator for 1-D cases using a tool making an angle of 10 degrees relative to a horizontal plane.
Figure 11D:
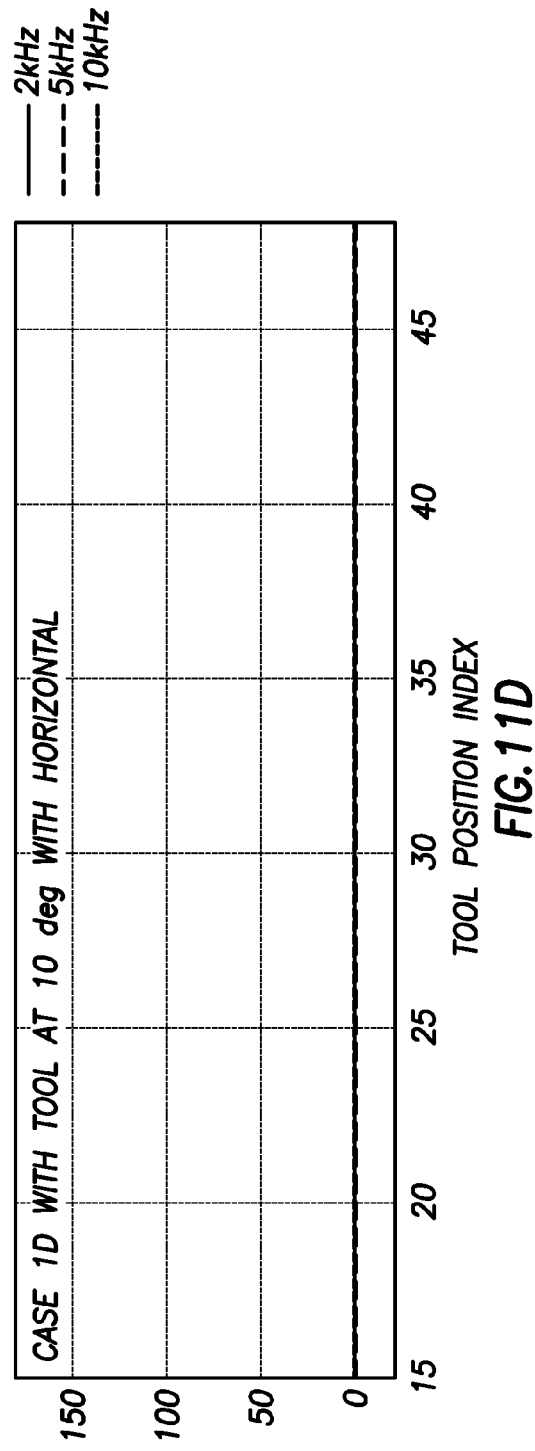
Figure 12C:
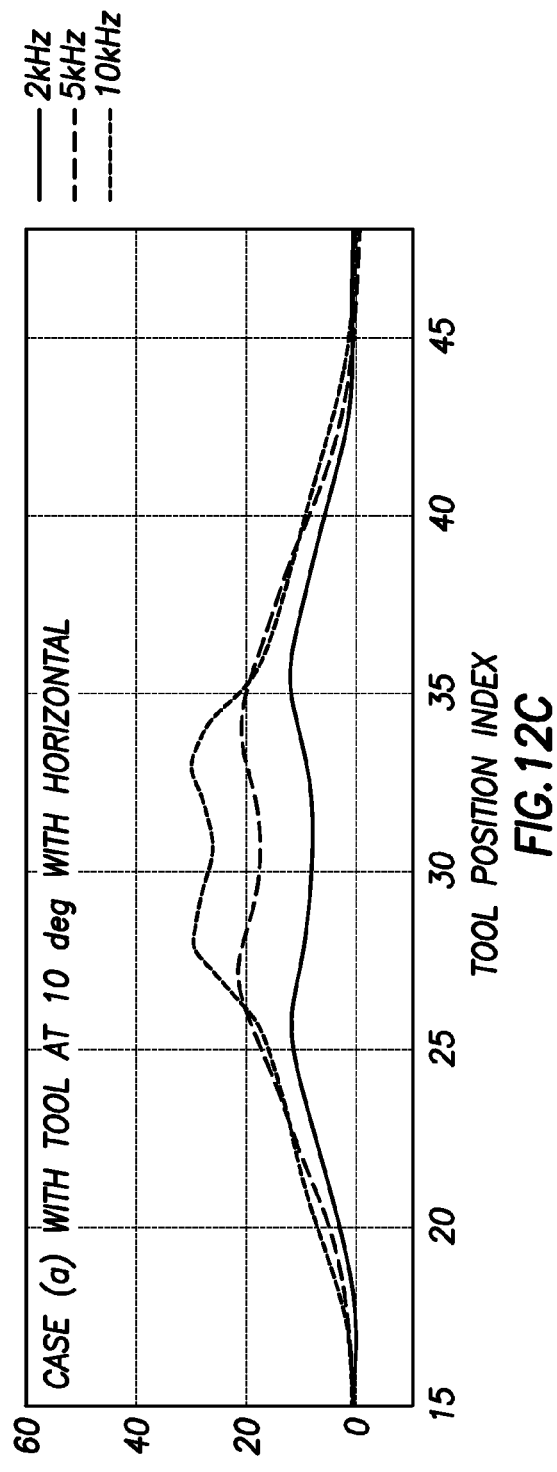
FIGS. 12C and 12D are amplitude and phase logs, respectively, of a 3-D Lateral Indicator for case (a) of FIG. 8 using a tool making an angle of 10 degrees relative to a horizontal plane.
Figure 12D:
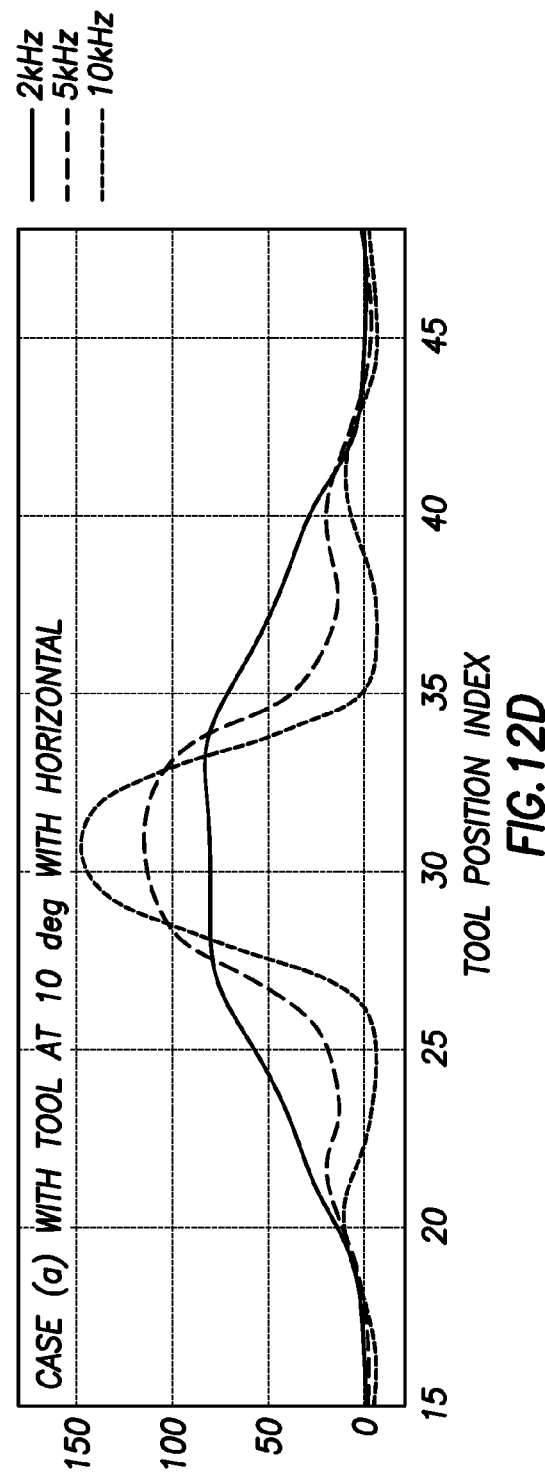
Figure 12E:
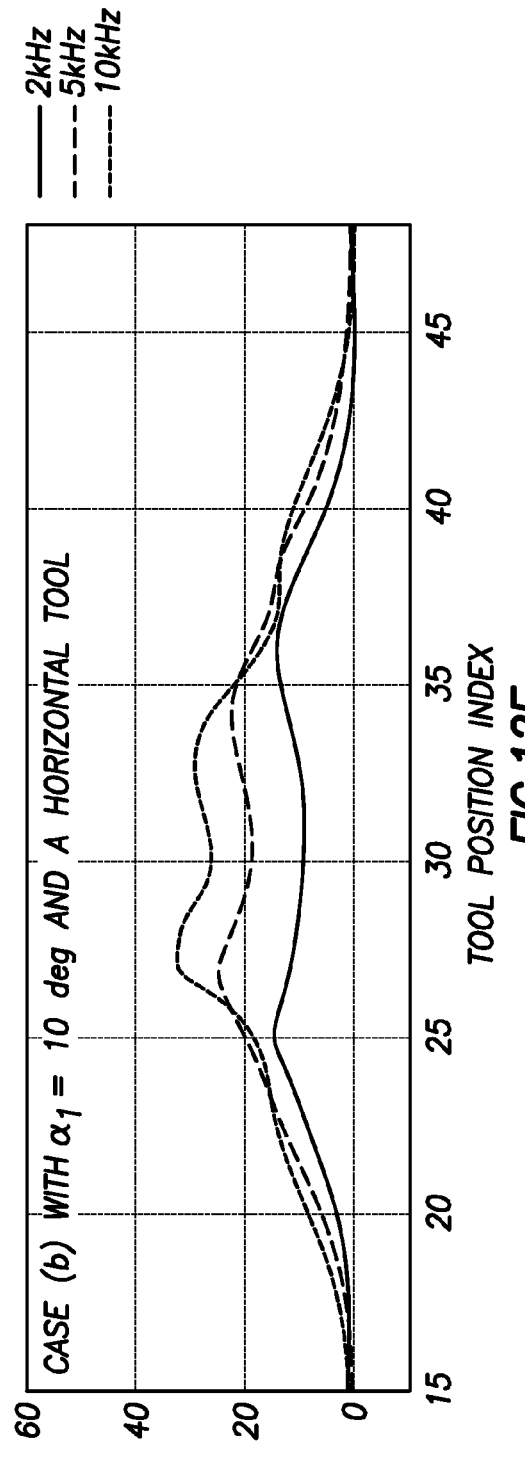
FIGS. 12E and 12F are amplitude and phase logs, respectively, of a 3-D Lateral Indicator for case (b) of FIG. 8 with $\alpha_1$ equal to 10 degrees and using a horizontal tool.
Figure 12F:
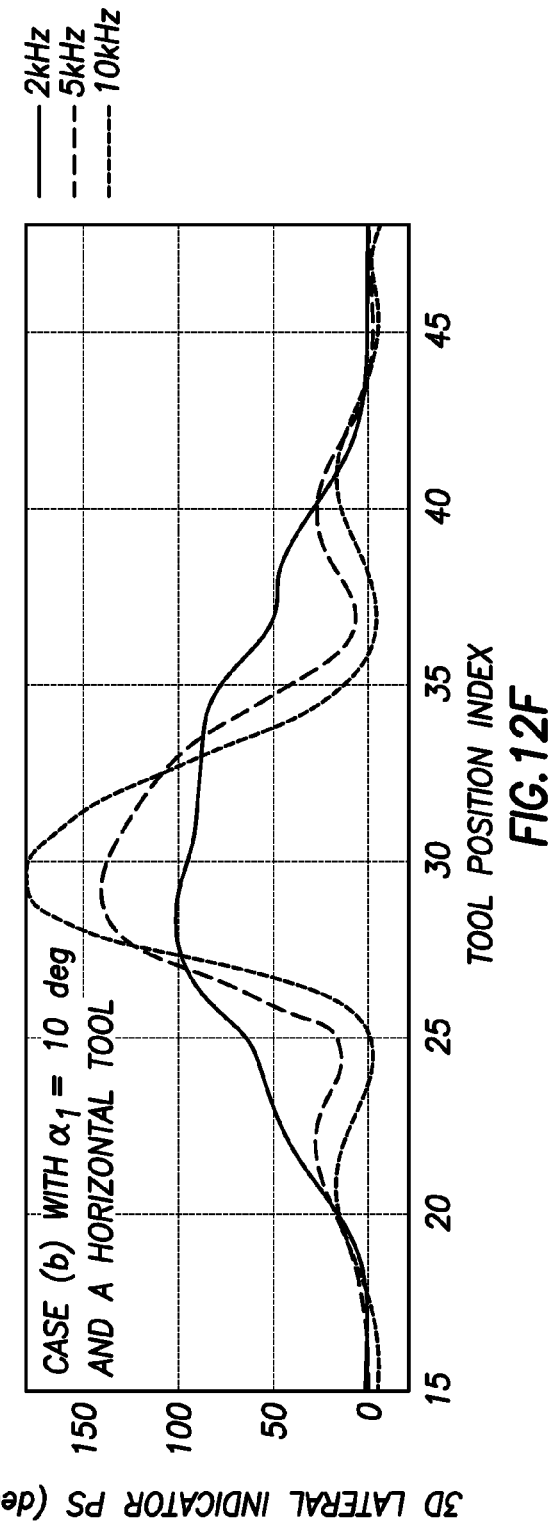
Figure 12G:
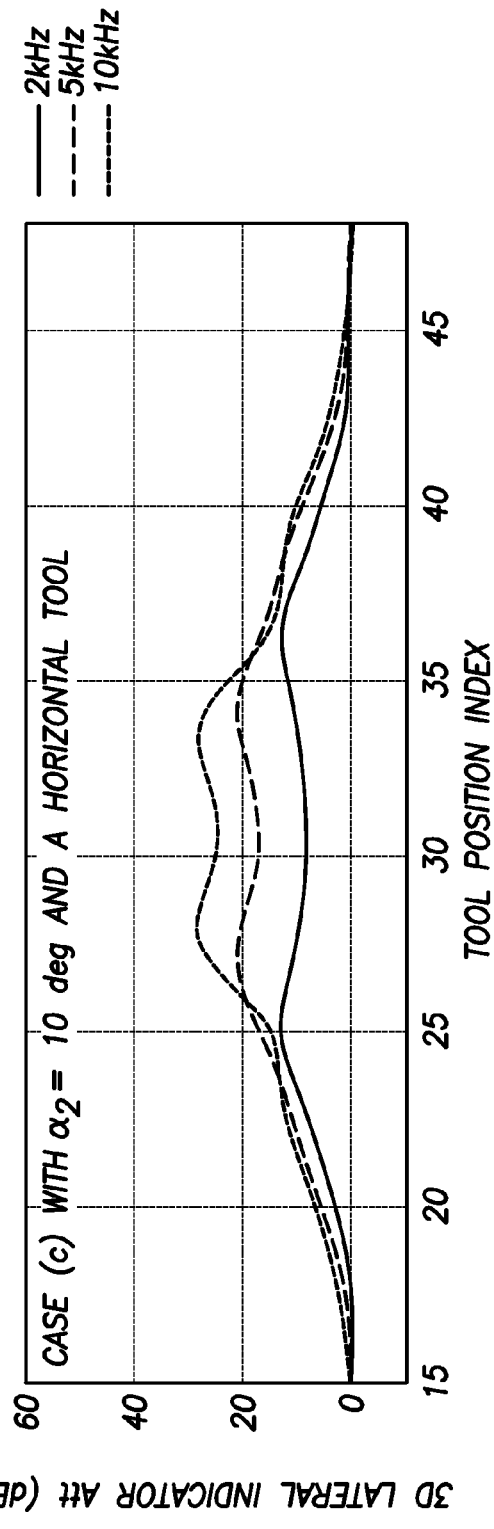
FIGS. 12G and 12H are amplitude and phase logs, respectively, of a 3-D Lateral Indicator for case (c) of FIG. 8 with $\alpha_2$ equal to 10 degrees and using a horizontal tool.
Figure 12H:
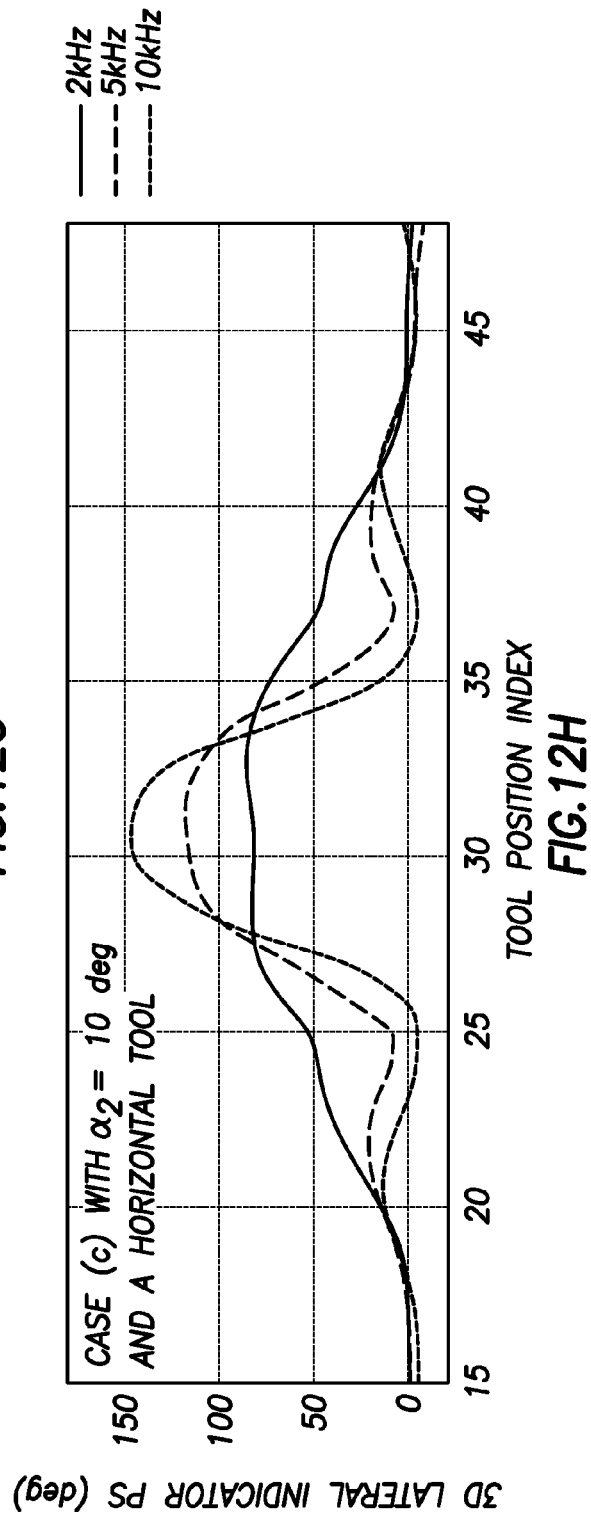

Simulation results are presented in various logs for four different 3-D configurations and for different measurement types and "equivalent 1-D situations. FIGS. 9A-9D, and FIGS. 10A-10H show the results for SD measurements, FIGS. 11A-11D, and FIGS. 12A-12H show the results for 3-D Lateral Indicator measurements, and FIGS. 13A-13D, and FIGS. 14A-14H show the results for 3-D Longitudinal Indicators. FIGS. 10A, 12A, and 14A correspond to Case (a) for the formation using a horizontal tool at different heights above, inside, or below the corner. FIGS. 10B, 12B, and 14B correspond to Case (a) for the formation using a tool making an angle of 10 degrees with a horizontal plane at different heights above, inside, or below the corner. FIGS. 10C, 12C, and 14C correspond to Case (b) for the formation with the angle $\alpha_1$ equal to 10 degrees and with a horizontal tool at different heights above, inside, or below the corner. FIGS. 10D, 12D, and 14D correspond to Case (c) for the formation with an angle $\alpha_2$ equal to 10 degrees and with a horizontal tool at different heights above, inside, or below the corner.

FIGS. 9A-9D, 11A-11D, and 13A-13D show those logs plotted for "equivalent" 1-D situations. From those plots, we see that the SD measurement is essentially insensitive to any change in the 3-D formation. Cases for other measurements using a horizontal tool give very similar responses. When close to the 3-D effect created by the "vertical" plane (i.e., 30 ft), one can note some differences between the "equivalent" 1-D case shown in FIGS. 9A-9D and the 3-D cases, regardless of the dip of the trajectory used.

The Lateral 3-D indicator shows a 3-D effect in all three simulated cases with comparable intensity of the signals, regardless of the angle of the "vertical" plane used. However, the indicator does vary with changes in lateral angle (Case (b)) and seems not to be particularly sensitive to changes in longitudinal angle (Case (c)).

The 3-D Longitudinal Indicator yields a weaker signal, but, nevertheless, allows a better understanding of 2-D/3-D situations. For example, it may help one ascertain whether the tool is approaching the side of a sand channel. The 3-D Longitudinal Indicator provides complementary information to the 3-D Lateral Indicator regarding the geometry of the formation.

While preferred embodiments have been described herein, those skilled in the art, having benefit of this disclosure, will appreciate that other embodiments are envisioned that do not depart from the inventive scope of the present application. Accordingly, the scope of the present claims or any subsequent related claims shall not be unduly limited by the description of the preferred embodiments herein.

What is claimed is:

1. A method to determine a characteristic of a subsurface formation using electromagnetic coupling components, comprising:
   providing a downhole logging tool having one or more transmitters and one or more receivers, and being capable of measuring the electromagnetic coupling components;
   measuring the electromagnetic coupling components using the downhole logging tool;
   forming a 3-D Lateral Indicator and a 3-D Longitudinal Indicator using the electromagnetic coupling components, wherein the 3-D Longitudinal Indicator indicates whether a change in lateral resistivity remains unchanged when the logging tool is effectively rotated around an axis normal to a longitudinal tool axis by 180 degrees; and
   using the 3-D Lateral Indicator and/or the 3-D Longitudinal Indicator to determine the characteristic of the subsurface formation.

2. The method of claim 1, wherein the downhole logging tool is a wireline tool or a while-drilling tool.

3. The method of claim 1, wherein the measurements are self-calibrated.

4. The method of claim 1, further comprising distinguishing between 1-D and 3-D effects.

5. The method of claim 4, wherein distinguishing between the 1-D and 3-D effects comprises separating the 1-D effects from the 3-D effects using a superposition of equivalent perpendicular contributions.

6. The method of claim 1, wherein the 3-D Lateral Indicator indicates whether the logging tool is in a plane of symmetry of the formation.

7. The method of claim 1, further comprising forming at least one of a DC-measurement, a 1H-measurement, and a 2H-measurement using the electromagnetic coupling components.

8. The method of claim 7, further comprising forming ratios using any two of the DC measurement, the 1H-measurement, and the 2H-measurement.

9. The method of claim 1, further comprising relating the transform of a DC-measurement, a 1H-measurement, or a 2H-measurement to its spatial sensitivity.

10. The method of claim 1, further comprising setting 1H-measurements and 2H-measurements equal to zero if a longitudinal tool axis is an axis of symmetry.

11. The method of claim 1, further comprising setting a minimum value of a 1H-measurement equal to zero if a plane passing through a longitudinal tool axis and an axis normal to the longitudinal tool axis is a plane of symmetry.

12. The method of claim 1, further comprising setting a measurement, whose signs changes if the logging tool is effectively rotated around an axis normal to a longitudinal tool axis by 180 degrees, to zero if the formation is flip-invariant.

13. A method to determine a characteristic of a subsurface formation using electromagnetic coupling components, comprising:
   providing a downhole logging tool having one or more transmitters and one or more receivers, and being capable of measuring the electromagnetic coupling components;
   measuring the electromagnetic coupling components using the downhole logging tool;
   forming measurement categories comprising a DC-measurement category, a 1H-measurement category, and a 2H-measurement category using the electromagnetic coupling components;

defining a Property 2 property and a Property 3 property using one or more of the measurement categories;

forming a 3-D Lateral Indicator using the Property 2 property and/or forming a 3-D Longitudinal Indicator using the Property 3 property; and using the 3-D Lateral Indicator and/or the 3-D Longitudinal Indicator to determine the characteristic of the subsurface formation.

14. The method of claim 13, wherein the Property 2 property comprises setting one or more minimum values of a 1H-measurement equal to zero if a plane passing through a longitudinal tool axis and an axis normal to the longitudinal tool axis is a plane of symmetry.

15. The method of claim 13, wherein the Property 3 property comprises setting a measurement, whose signs changes if the logging tool is effectively rotated around an axis normal to a longitudinal tool axis by 180 degrees, to zero if the formation is flip-invariant.

16. The method of claim 13, wherein the DC-measurement category comprises quantities that are rotationally invariant if the logging tool is rotated about a longitudinal tool axis, the 1H-measurement category comprises quantities that change sign if the logging tool is rotated 180 degrees about the longitudinal tool axis, and the 2H-measurement category comprises quantities that change sign if the logging tool is rotated 90 degrees about the longitudinal tool axis.

17. The method of claim 13, further comprising using the 3-D Lateral Indicator to split the 3-D effect based on a superposition of equivalent perpendicular contributions.

18. The method of claim 13, wherein the value of the 3-D Lateral Indicator represents a resistivity contrast.

19. A downhole logging tool, comprising:

one or more transmitters and one or more receivers, capable of measuring electromagnetic coupling components; and a downhole processor that computes a 3-D Lateral Indicator and a 3-D Longitudinal Indicator using the electromagnetic coupling components, wherein the 3-D Longitudinal Indicator indicates whether a change in lateral resistivity remains unchanged when the logging tool is effectively rotated around an axis normal to a longitudinal tool axis by 180 degrees.

* * * * *